Sept. 15, 1959 E. H. LAND 2,903,951
PHOTOGRAPHIC APPARATUS AND PRODUCT USEFUL THEREIN
Filed June 25, 1957 10 Sheets-Sheet 1

INVENTOR.
Edwin H. Land
BY Brown and Mikulka
and
Robert E. Corb
ATTORNEYS

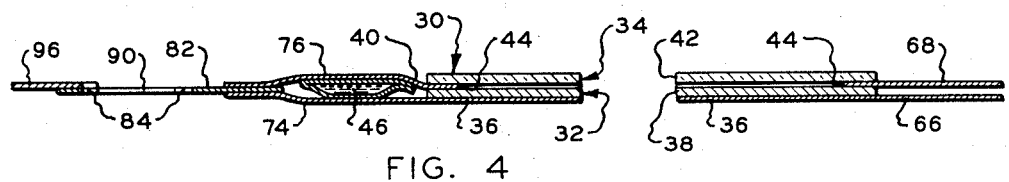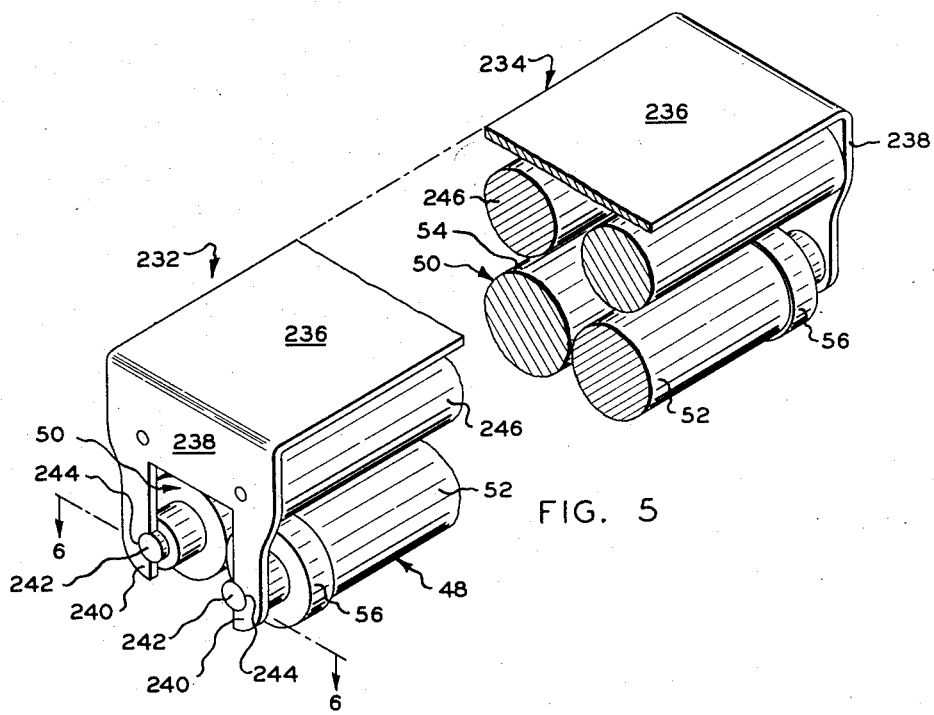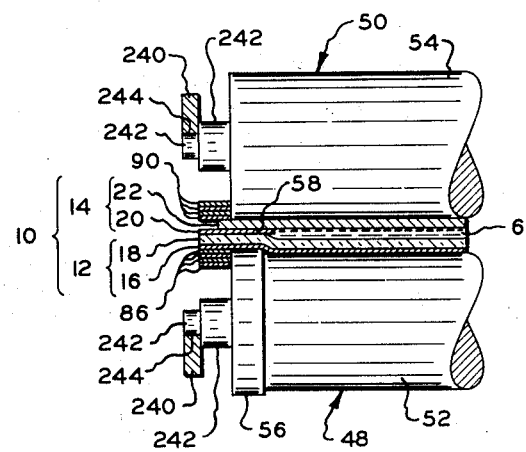

Sept. 15, 1959  E. H. LAND  2,903,951
PHOTOGRAPHIC APPARATUS AND PRODUCT USEFUL THEREIN
Filed June 25, 1957  10 Sheets-Sheet 4

INVENTOR.
Edwin H. Land
BY Brown and Mikulka
and
Robert E. Cork
ATTORNEYS

Sept. 15, 1959      E. H. LAND      2,903,951

PHOTOGRAPHIC APPARATUS AND PRODUCT USEFUL THEREIN

Filed June 25, 1957      10 Sheets-Sheet 6

INVENTOR.
Edwin H. Land
BY Brown and Mikulka
and
Robert E. Corb
ATTORNEYS

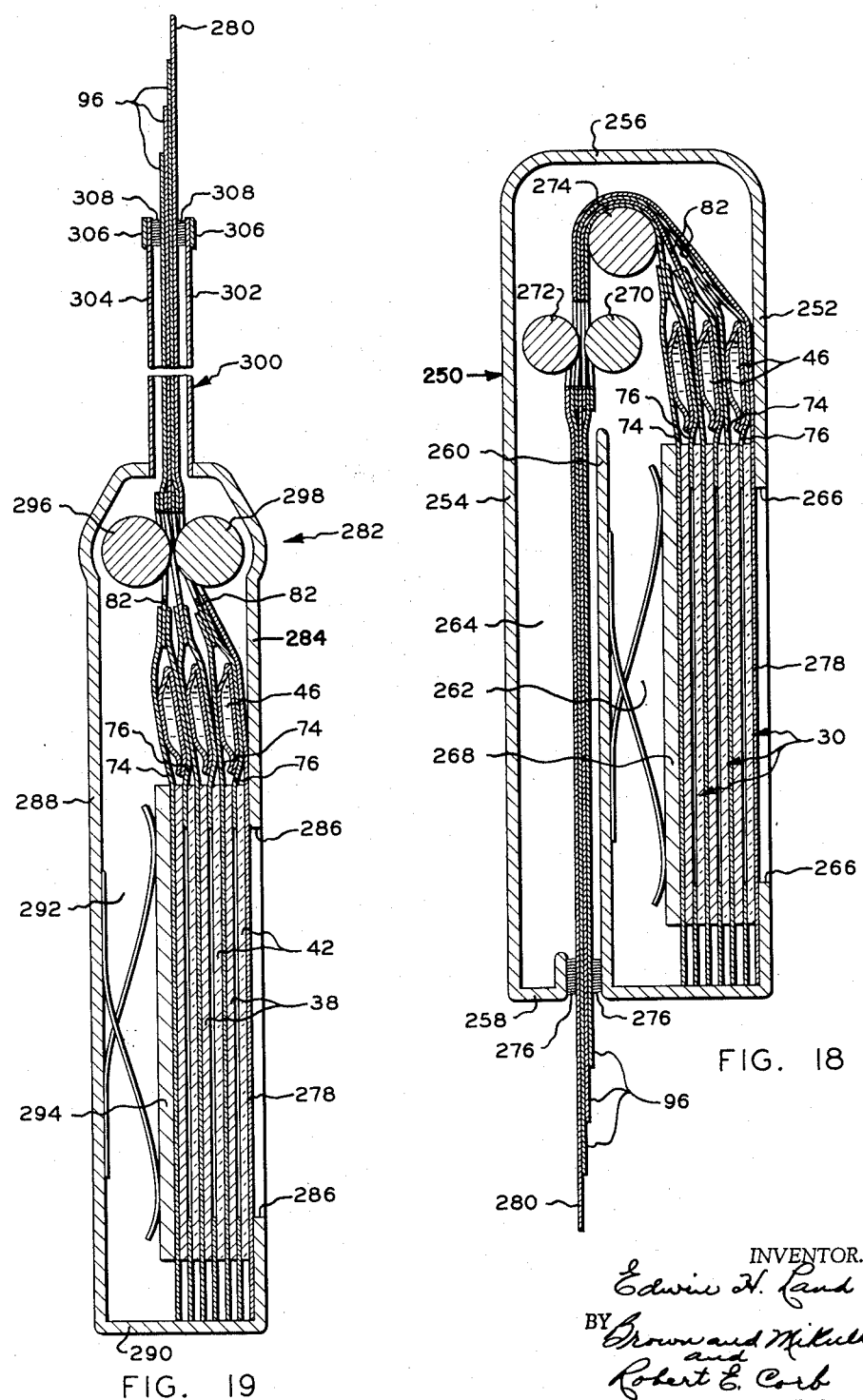

Sept. 15, 1959 E. H. LAND 2,903,951
PHOTOGRAPHIC APPARATUS AND PRODUCT USEFUL THEREIN
Filed June 25, 1957 10 Sheets-Sheet 9

INVENTOR.
Edwin H. Land
BY Brown and Mikulka
and
Robert E. Corb
ATTORNEYS

United States Patent Office 2,903,951
Patented Sept. 15, 1959

2,903,951

PHOTOGRAPHIC APPARATUS AND PRODUCT USEFUL THEREIN

Edwin H. Land, Cambridge, Mass., assignor to Polaroid Corporation, Cambridge, Mass., a corporation of Delaware Application June 25, 1957, Serial No. 667,882

81 Claims. (Cl. 95—19)

This invention relates to photographic apparatus and products useful therein and, more particularly, to novel apparatus including photosensitive materials and means for exposing and processing said photosensitive materials, and to novel products useful in such apparatus.

Generally, the present invention is concerned with photographic products and apparatus of the type wherein a photosensitive sheet material, preferably comprising photosensitive silver halide, is exposed and is thereafter treated with a fluid reagent in conjunction with another sheet material to produce photographic prints, preferably by a process involving the transfer of image-forming substances resulting from the development of the latent image in the exposed photosensitive silver halide. A variety of forms of products and apparatus of this type, with which the present invention is concerned, have been proposed and as a general rule include means for storing and positioning for exposure one or more exposure frames of photosensitive sheet material, means for storing one or more areas of a second sheet material superposable with the exposure frames, means preferably in the form of a plurality of rupturable containers, containing a fluid processing reagent for distribution between each exposed frame of a photosensitive sheet and an area of a second sheet, and means for superposing one set or a succession of sets of frames and areas of the photosensitive and second sheets and distributing the fluid processing reagent from a container in a thin layer between each frame and area. This last-mentioned means for superposing an exposed frame and area of two sheets and distributing a fluid processing reagent therebetween comprises a pair of juxtaposed pressure-applying members, usually rolls, between which the sheets are moved in superposition for spreading the fluid, usually provided in a rupturable container located between the sheets, between the superposed frame and area.

In the form of product and apparatus of the type with which the present invention is concerned, the exposure frames of the photosensitive material are provided as individual sheets, the areas of a second sheet material to be superposed with the exposure frame are also provided as individual second sheets, and the fluid processing reagent is provided in a plurality of rupturable containers each adapted to be located between a photosensitive and second sheet during movement of the sheets in superposition between a pair of pressure-applying members. A photosensitive sheet may be exposed while it is located in superposition with a second sheet, or, as is the more common practice, the photosensitive and second sheets are provided in separate stacks, exposure of each photosensitive sheet being effected when it is spaced apart from its corresponding second sheet; and thereafter the two sheets are moved in superposition between a pair of pressure-applying members. For this purpose each sheet or pair of sheets is provided with an attached leader or leaders which projects from the product or apparatus within which the photosensitive sheet is exposed, and may be grasped for drawing each pair of sheets between the pressure-applying members.

Various expedients have been suggested for manipulating both the leaders and the pressure-applying members whereby the leaders may be made to extend between the pressure-applying members so that they can be engaged for drawing the sheets, one pair at a time, between the pressure-applying members. In one form of apparatus, for example shown in the copending application of Edwin H. Land et al., Serial No. 492,848, filed March 8, 1955, now Pat. No. 2,854,903, this is accomplished by spacing apart the pressure-applying members and threading a leader or leaders connected to a photosensitive and second sheet between the pressure-applying members. This must be done each time a pair of sheets are to be withdrawn between the pressure-applying members to process the photosensitive sheet. One suggestion for eliminating the necessity for threading the leader or leaders attached to each pair of sheets between the pressure-applying members each time a pair of sheets are to be processed is made in the copending application of Edwin H. Land, Serial No. 537,982, filed October 3, 1955, now Patent No. 2,834,269, wherein all the leaders extend between the pressure-applying members and compressive pressure is applied thereby to each pair of superposed sheets through the leaders of the remaining pairs of sheets as the pair of sheets being processed is drawn between the pressure-applying members and between said other leaders.

An object of the invention resides in the provision of a novel film assemblage of the type described which may extend, together with at least another film assemblage, between a pair of pressure-applying members and permits the pressure-applying members to act directly on the other assemblage during movement thereof between the pressure-applying members.

The present invention represents an improvement over prior art products and apparatus of the above-mentioned type and has, as another of its objects, the provision of photographic devices wherein a plurality of leaders attached to a plurality of pairs of photosensitive and second sheets extend between a pair of pressure-applying members between which the pairs of sheets are to be drawn by said leaders and each of said leaders is provided with an opening in the region thereof located between said pressure-applying members whereby each of said pairs of sheets can be moved between the leaders attached to other sheets and between and in direct contact with the pressure-applying members so that compressive pressure is applied by the members directly to the sheets being moved therebetween.

Further objects of the invention are: to provide photographic apparatus for exposing a plurality of photosensitive sheets and thereafter processing said photosensitive sheets by distributing a fluid processing reagent between each exposed photosensitive sheet and a second sheet superposed therewith, and products useful in said apparatus, said products and apparatus including means housing a plurality of photosensitive and second sheets and positioning said photosensitive sheets for exposure, a pair of pressure-applying members having juxtaposed pressure-applying portions intermediate their ends between which a photosensitive and second sheet are moved in superposition for distributing a fluid reagent between said sheets, and a plurality of leaders attached to said photosensitive and second sheets and extending between said pressure-applying members from said housing means, each of the leaders having an elongated transverse opening in the region thereof located between said members and at least equal in length to the length of the pressure-applying portions of said members whereby said pressure-applying portions may contact a pair of sheets as said sheets are moved between said members and between the leaders of other sheets extending between the members; to provide photographic products and apparatus as described wherein each of the leaders is formed of paper and includes a relatively stiff reinforcing element in the region of the side of said opening opposite the photosensitive and/or second sheet attached to said leader; and to provide photographic products and apparatus as described wherein the pressure-applying members comprise elongated rolls mounted for rotation at their ends and each of said leaders comprises marginal portions at the opposite ends of the opening in said leader and extending adjacent the ends of said rolls on opposite ends of the pressure-applying portions thereof.

Still further objects of the invention are: to provide a photographic product including a plurality of film units each comprising a photosensitive sheet, a second sheet superposable therewith and leader means for drawing the photosensitive and second sheets of each film unit in superposition between a pair of pressure-applying members, said leader means including at least one leader attached to at least one of said photosensitive and second sheets, said leader having a first section attached to at least one of said sheets and adapted to be located to one side of a pair of pressure-applying members mounted in juxtaposition at their end portions and having pressure-applying portions intermediate said end portions, a second section adapted to be located in the opposite side of said pair of pressure-applying members and a pair of spaced-apart elements joining said first and second sections and extending between said end portions of said pressure-applying members on opposite ends of said pressure-applying portions of said members; and to provide a photographic product as described wherein at least said first section of said leader is paper and at least said second section of said leader comprises a relatively stiff material for resisting bending Still other objects of the invention are: to provide photographic apparatus for exposing and processing a plurality of film assemblages each comprising a photosensitive sheet, a second sheet and leader means including at least one leader attached to at least one of the sheets, and products useful in said apparatus, said products and apparatus including housing means providing a first chamber in which a plurality of photosensitive sheets are stored and exposed, and a second chamber for receiving each film assemblage from the first chamber during processing thereof and a pair of pressure-applying members mounted between the first and second chambers for distributing a fluid processing reagent between the sheets of each assemblage as the sheets are moved from the first chamber between the pressure-applying members into the second chamber, the leader means comprising each of said assemblages extending between the pressure-applying members and through the second chamber whereby each pair of sheets can be moved between the pressure-applying members into the second chamber, and each leader of each of said leader means having an opening in the region thereof located between the pressure-applying members so that compressive pressure can be applied by the pressure-applying members directly to the sheets being moved between said members and between the leaders attached to other sheets; and to provide products and apparatus as described wherein the housing means includes a third chamber in which the second sheets are stored in stacked relation apart from the photosensitive sheets, and wherein said leader means of each assemblage comprises a pair of said leaders, each of which is attached to one of the photosensitive and second sheets.

Other objects of the invention will in part be obvious and will in part appear hereinafter.

The invention accordingly comprises the apparatus possessing the construction, combination of elements and arrangement of parts, and the product possessing the features, properties and the relation of components which are exemplified in the following detailed disclosure, and the scope of the application of which will be indicated in the claims.

For a fuller understanding of the nature and objects of the invention, reference should be had to the following detailed description taken in connection with the accompanying drawings wherein:

Fig. 4 is a view, similar to Fig. 1, of another form of assemblage embodying the invention;

Fig. 5 is a fragmentary perspective view of a device including a pair of pressure-applying members suitable for incorporation into products embodying the invention;

Fig. 6 is a fragmentary sectional view taken along the line 6—6 of Fig. 5 and illustrating the operation of the pressure-applying members on a film assemblage;

Figs. 18, 19 and 20 are views, similar to Fig. 17, showing other forms of magazines embodying the invention.

In that aspect of the photographic art which has been generally characterized as Land photography and which involves obtaining a picture directly in the camera, certain advantages arise from the use of photosensitive and other sheets in the form of individual units, i.e., in the form of cut film as distinguished from roll film. The camera, in combinations of this type, cooperates with the film units to house one or more assemblages, each of which comprises a photosensitive and a second sheet, and for each of which there is provided in the camera a source of fluid processing composition, preferably carried by rupturable containers which may be mounted on one or another of the sheets of each assemblage. Means are provided for spreading the fluid processing composition between the photosensitive or other second sheets of each assemblage, preferably after exposure of the former and as the film assemblage is withdrawn from the camera by suitable tab or leader means attached to each assemblage and extending from the camera. Insofar as the actual spreading of the fluid between the sheets is concerned, it is desirable to use a single spreading means for the plurality of assemblages being processed and to have the pressure-applying members of said spreading means perform the function by directly engaging and applying pressure to the photosensitive and other sheets between which the fluid is being spread. In the system heretofore proposed, this would require considerable manipulation of the product or apparatus and the leaders attached to the photosensitive and second sheets for threading the leader or leaders attached to each pair of sheets between the pressure-applying members each time a pair of sheets is to be processed in order to have the pressure-applying members directly engage the sheets of each assembly as it is moved between the members. By virtue of the present invention, all the leaders or tabs can project from the housing and the only manipulation required, of the film pack or camera, in order to process an exposed photosensitive sheet and locate the next successive sheet for exposure is to simply grasp and draw on one or more leaders projecting from the housing. The construction of such a pack or camera is relatively uncomplicated, inexpensive and easy to assemble and its operation is much more simplified, convenient and dependable than other film packs or apparatus of this general type.

Figure 1:
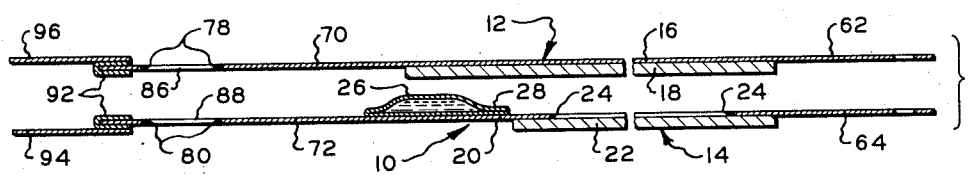
Figure 1 is a diagrammatic sectional view, taken intermediate the sides of a photographic assemblage embodying the invention.
Figure 2:
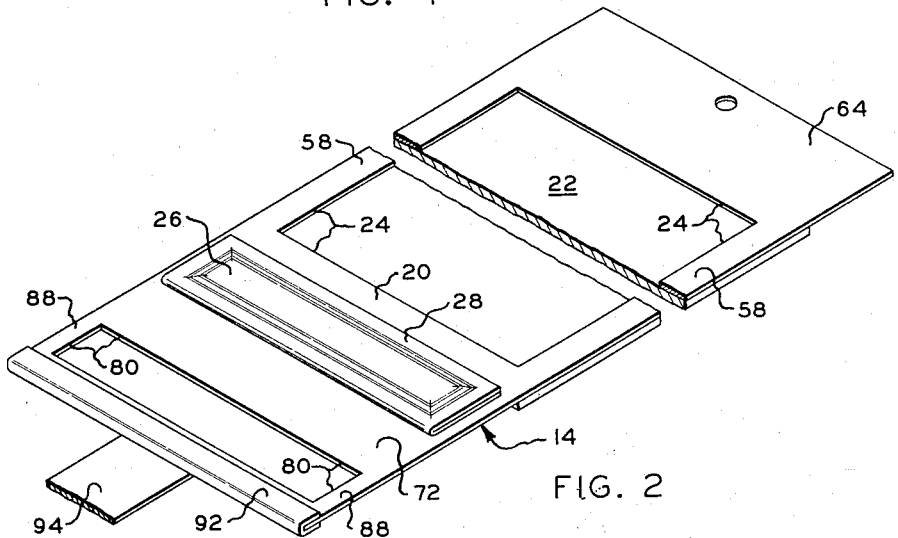
Fig. 2 is a diagrammatic perspective view of an element of the assemblage of Fig. 1.
Figure 3:
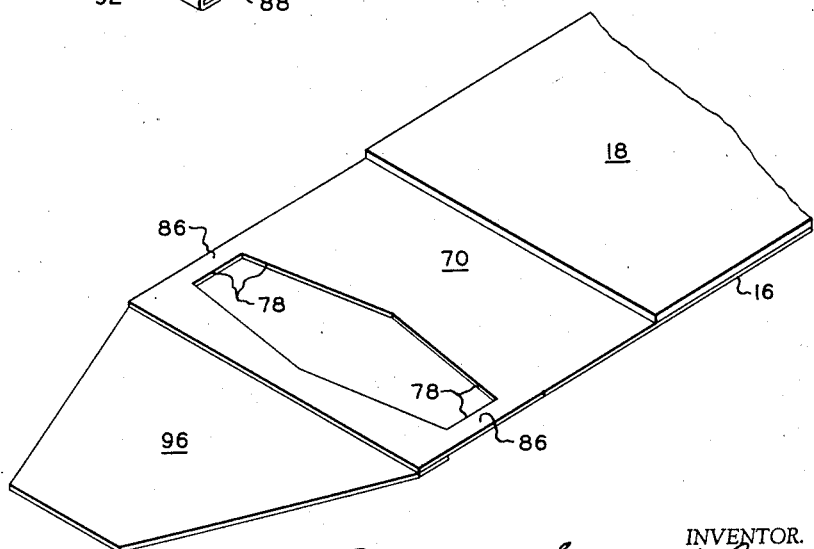
Fig. 3 is a diagrammatic perspective view of a modified form of another element of the assemblage of Fig. 1.

Photographic products and apparatus of the invention comprise a plurality of film assemblages, each film assemblage, in turn, comprising a photosensitive element, a second or print-receiving element and one or more leaders attached to the photosensitive and second elements. Film assemblages of this type may be of a variety of different forms, one of which is shown in Figs. 1 through 3 of the drawings, the thicknesses of the materials comprising the assemblage being exaggerated for clarity of illustration. The film assemblage, designated 10, comprises a photosensitive element 12 and a second or print-receiving element 14. The two elements are in the form of sheets, are preferably substantially coextensive in size and shape and are adapted to be superposed with one another. Photosensitive element 12 as shown comprises a leader or carrier sheet 16 on which is mounted a photosensitive sheet 18 located intermediate the ends of the carrier sheet more closely adjacent the trailing end than the leading end thereof. Carrier sheet 16 is formed of a relatively thin but strong material such as paper and the photosensitive sheet 18 comprises a layer of a photosensitive material, preferably a silver halide emulsion, carried on a suitable support which may be paper or one of the organic plastic materials usually used for film base, such as cellulose acetate and the like.

The second or print-receiving element 14 comprises a leader or carrier sheet 20 similar in shape to, and preferably substantially coextensive with, carrier sheet 16, and a second or print-receiving sheet 22 mounted on the side of the carrier sheet opposite the side thereof adapted to be superposed with the photosensitive element at a position intermediate the ends of the carrier sheet and closest the trailing end thereof so that the photosensitive and print-receiving sheets will be in substantial registration with one another when the carrier sheets are located in superposed registered relationship. Carrier sheet 20 is provided with an aperture 24, preferably rectangular, overlying print-receiving sheet 22 and defining the area thereof in contact with which a fluid processing reagent is spread and in which a transfer print is formed. The print-receiving sheet 22 preferably comprises an image-receiving layer carried on a suitable support. The support may be of any suitable sheet material such as paper and organic materials useful as a base for photographic films and prints, the choice of materials depending on the manner in which the print is to be exhibited. The image-receiving layer comprises a material layer formed on the support or as a stratum of the support for receiving and/or supporting the transfer image formed by materials produced as a result of the development of a latent image in the photosensitive sheet.

The photosensitive element, following exposure, is adapted to be superposed with the print-receiving element and the two elements moved in superposition between a pair of pressure-applying members for spreading a fluid processing reagent in a thin layer between the photosensitive and print-receiving sheets of the two elements. In the form of film assemblage shown in the drawings, the fluid processing reagent is provided in a rupturable container 26 attached to carrier sheet 20 on the side thereof opposite second sheet 22 (between the superposed sheets). Container 26 is preferably formed of an elongated rectangular blank of a multilayer sheet material which is impervious to air and the fluid processing reagent. The blank is folded longitudinally upon itself and the end and longitudinal margins are sealed to one another to form a cavity in which a predetermined quantity of the fluid processing reagent is contained. The longitudinal edge seal of the container is substantially weaker than the two end seals so that the application of compressive pressure to the walls of the container will cause rupture of the longitudinal seal and the unidirectional discharge of the fluid contents of the container. Container 26 is mounted on carrier sheet 20 with the longitudinal sealed portions, designated 28, extending transversely of the carrier sheet and located closely adjacent the leading edge of aperture 24 and print-receiving sheet 22 so that the application of compressive pressure to the container will cause the discharge of its contents in the direction of the area of sheets 18 and 22 between which said fluid is to be spread. For best results, the liquid-carrying cavity of the container should be substantially equal in length to the width of aperture 24 so that the fluid contents of the container will be released therefrom in an elongated mass extending substantially from side to side of the area over which it is to be spread.

The film assemblage, in one form, may comprise materials for effecting the formation of a positive print by a silver-transfer reversal process, the photosensitive sheet comprising a silver halide emulsion and the fluid reagent including a silver halide developer and a silver halide solvent. Processes of this type and materials suitable for use therein for producing transfer prints directly from an exposed photosensitive material are well known in the art and are described in greater detail in Patents Nos. 2,543,181, issued February 27, 1951, 2,661,293, issued December 1, 1953, and 2,662,822, issued December 15, 1953, all in the name of Edwin H. Land.

As previously noted, the photosensitive element is exposed within the housing of a film pack, camera or other apparatus and is thereafter superposed with the second element and the two elements are moved, commencing in the region of their leading ends, between a pair of pressure-applying members for first rupturing a container located between the elements and then spreading the fluid contents of the container in a layer therebetween to form a sandwich. As this sandwich comprising the photosensitive and second sheets and a layer of fluid processing reagent is formed, it may be moved into a second or processing chamber in which it is maintained in a light-tight environment until processing is complete; or it may be removed from the film pack or camera into the light. In this latter instance provision must be made for preventing exposure of the photosensitive layer of the photosensitive sheet. This may be accomplished, for example, by providing the support for second sheet 22, and either or both the support for photosensitive sheet 18 and carrier sheet 16, of a material, or with a coating of a material, which is opaque to actinic light. As the fluid processing reagent is distributed between the two elements, it functions as an adhesive for holding the photosensitive and print-receiving sheets in superposition. Prevention of the exposure of the photosensitive sheet can be further assured by providing a light-absorbing dye or pigment in the processing reagent.

Another basic form of film assemblage is shown in Fig. 4 of the drawings and is designated 30. Assemblage 30 comprises a photosensitive element 32 and a second or print-receiving element 34 located in superposition with one another, and is of the type wherein the photosensitive and print-receiving elements are adapted to remain in superposition at least during exposure and processing of the photosensitive element. The photosensitive element comprises a carrier or leader sheet 36 and a photosensitive sheet 38 mounted thereon and the second or print-receiving element comprises a carrier sheet 40 for a second or print-receiving sheet 42 located in registered relation with photosensitive sheet 38. Carrier sheet 40 is provided with an aperture 44 underlying the print-receiving sheet and adapted to define the area thereof in which a positive transfer print is formed. A container 46 of a fluid processing reagent is provided secured between the two elements, preferably to the inner surface of carrier sheet 40 adjacent the leading edges of the photosensitive and second sheets. Print-receiving sheet 42 is preferably transparent so that the photosensitive sheet can be exposed therethrough and this form of film assemblage can be readily adapted to the production of color prints and/or prints having a three-dimensional effect by providing the print-receiving sheet with a conventional photographic screen comprising, for example, a multiplicity of minute filter elements or lens elements in accordance with any of a number of practices well known in the art, such, for example, as taught by Patent No. 2,726,154, issued December 6, 1955, in the name of Edwin H. Land.

A number of other modifications of this form of film assemblage may suggest themselves and are known in the art. For example both the photosensitive and print-receiving sheets may be transparent and may be maintained in superposition, following formation between the sheets of a positive image adapted to be viewed by transmitted light, and having a higher covering power than the negative image which is also formed between the sheets. If it is desirable to form a reflection print rather than a transparency, the photosensitive sheet may be transparent and the print-receiving sheet may be opaque, and exposure is made through the photosensitive sheet. Of course, this will require a somewhat different arrangement of the carrier sheets and will result in a geometrically reversed positive print. Another expedient available for producing a positive reflection print in this type of film assemblage is described in Patent No. 2,563,342, issued August 7, 1951, in the name of Edwin H. Land and includes providing an opaque, water-permeable layer between the photosensitive layer and the print-receiving layer.

As previously noted, the film assemblages are adapted to be processed by advancing them between a pair of pressure-applying members. A preferred form comprises a pair of juxtaposed rolls 48 and 50 such as are shown in Figs. 5 and 6 of the drawings. The pressure-applying rolls are substantially elongated and cylindrical and are mounted in juxtaposition and resiliently urged toward one another by means which will be described in detail hereinafter. For a better understanding of the method of spreading a fluid processing reagent between the photosensitive and second sheets, reference may be had to Fig. 6 of the drawings wherein there is illustrated the construction and the operation of the rolls on a film assemblage for spreading a fluid processing reagent in a layer between the photosensitive and print-receiving sheets of the assemblage. Each of rolls 48 and 50 includes a substantially straight cylindrical pressure-applying portion designated, respectively, 52 and 54, and roll 48 is additionally provided with raised cylindrical shoulder portions 56 at its ends adapted to space apart the pressure-applying portions of the rolls and to aid in confining the fluid spread between the sheets and controlling the thickness of the layer of fluid.

Carrier sheet 20 includes marginal portions 58 at the opposite sides of aperture 24 and providing masking portions for defining the lateral edges of the area of the print-receiving sheet 22 in which a transfer print is formed, as well as aiding in controlling the thickness of the layer of processing fluid, designated 60 in Fig. 6. Shoulders 56 on roll 48 engage film assemblage 10 in the regions of masking portions 58 so as to provide a predetermined spacing between the adjacent surfaces of photosensitive sheet 18 and second sheet 22 within which the fluid is confined and is spread in a layer 60 of predetermined thickness by movement of the assemblage between the rolls.

In order to insure that the fluid processing reagent is spread in a layer of predetermined thickness over the entire area of the two sheets, an excess amount of fluid reagent is usually provided in the container. For this reason the film assemblages are provided with means for trapping and retaining the excess fluid to prevent it from being squeezed from between the trailing ends of the sheets and collecting on the pressure-applying rolls. A number of forms of fluid-trapping means have been proposed and these include, for example, members located between the trailing ends of the photosensitive and second elements adjacent their lateral margins for spacing the rolls apart to provide a space between the trailing ends of the elements in which any excess fluid is collected and retained.

In the present invention trapping of the excess fluid reagent is accomplished by providing each of carrier sheets 16, 20, 36 and 40 with a trailing end portion designated, respectively, 62, 64, 66 and 68 extending substantially beyond the trailing edge of the photosensitive or print-receiving sheet mounted thereon. Trailing end portions 62, 64, 66 and 68 may comprise the carrier sheets, or may comprise separate sheets attached to the carrier sheets. The pressure-applying rolls are resiliently urged toward one another but are mounted so that they can be spaced or moved a predetermined distance apart before meeting the opposition of the resilient means for urging them toward one another. In other words, materials of a predetermined thickness can be moved between the rolls without the application of compressive pressure on the materials by the rolls. This distance that the rolls can be spaced apart before meeting with the opposition of the resilient means which urges them toward one another, or the spacing between the pressure-applying portions of the rolls allowable before pressure is applied by the rolls, is preferably slightly less than the combined thicknesses of photosensitive element 12, print-receiving element 14 and the layer of fluid 60 spread therebetween, and is preferably approximately equal to the combined thicknesses of the walls of container 26 and a pair of carrier sheets 16 and 20. The maximum spacing between shoulders 56 on roll 48 and the surface of roll 54 before compressive pressure is applied by the rolls is just sufficiently less than the combined thicknesses of photosensitive element 12 (carrier sheet 16 and photosensitive sheet 18), second sheet 22 and masking portions 58 of carrier sheet 20 so that the elements are compressively engaged at their margins.

The carrier sheets are preferably formed of materials which are thinner than either the photosensitive or print-receiving sheets so that, as the trailing end portion of a pair of carrier sheets moves between the rolls, no pressure is applied to the trailing end portions and a space is provided between the trailing end portions in which excess fluid is trapped and retained. The above-described mounting of the rolls with a maximum allowable spacing between them wherein no compressive pressure is applied has other advantages in addition to providing a convenient method of trapping excess fluid. This arrangement also makes it possible to draw the leaders attached to the film assemblages and the trailing end portions of each assemblage between the rolls by the application of comparatively little force since the rolls apply little or no compressive pressure to the leaders and trailing end portions. It also simplifies considerably the construction of the means for mounting the rolls and biasing them toward one another since there is comparatively little movement of the rolls with respect to one another while they are actually applying compressive pressure.

Figure 10:
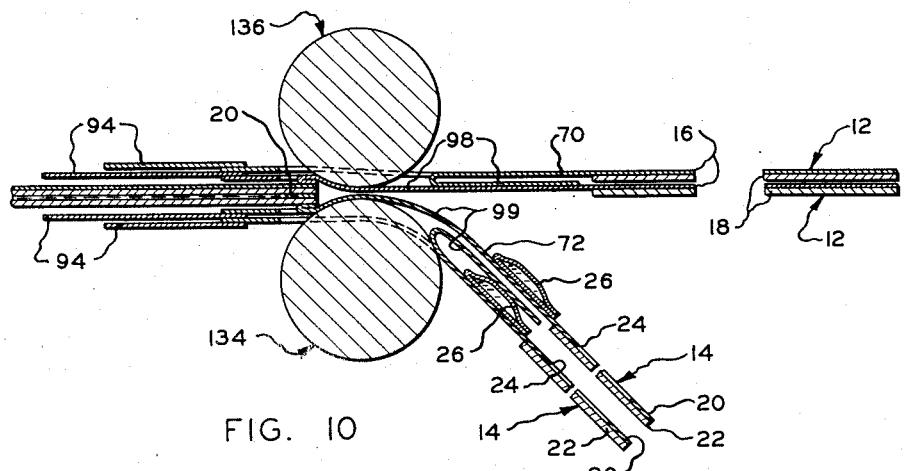
Fig. 10 is a diagrammatic sectional view illustrating another form of film assemblage and its cooperation with a pair of pressure-applying members.

Another means for and method of trapping excess processing reagent is illustrated in Fig. 10 of the drawings. In this form of film assemblage 10, opening 78 in leading end portion 70 of each photo-sensitive element is provided by folding a section of flap 98 of portion 70 back toward the trailing end of the photosensitive element, and opening 80 in leading end portion 72 of each print-receiving element is provided by folding a section of flap 99 thereof back toward the trailing end of the print-receiving element. These flaps 98 and 99 are intended to be folded forward between the pressure-applying members to function as traps for the processing fluid of the previous pair of photosensitive and second elements as the trailing ends of said elements are moved between the pressure-applying members. Flaps 98 and 99 of each pair of elements are folded inwardly toward one another and are provided on their inner surfaces with an adhesive material which has a strong affinity for itself but not for other materials. The outer surfaces of the trailing ends of the photosensitive and print-receiving elements are provided with the same adhesive material so that, as the trailing ends of a pair of elements are moved between the flaps of the next successive pair of elements, the flaps are adhered to the trailing ends and are drawn thereby between the pressure-applying members, or rolls, so that the flaps are located between the rolls and act as traps for any excess fluid that may be squeezed from between the trailing ends of the previous pairs of photosensistive and print-receiving sheets.

Each of carrier sheets 16, 20, 36 and 40 includes a leading end portion designated, respectively, 70, 72, 74 and 76 extending beyond the leading edge of the photosensitve or print-receiving sheet attached thereto. The leading end portions of the carrier sheets provide means whereby the photosensitive and print-receiving elements of each assemblage can be drawn, in superposition, between a pair of pressure-applying members, as well as means for mounting a container of precessing fluid between the elements. In assemblage 10 shown in Figs. 1 through 3, container 26 is attached to the surface of leader portion 72 which is opposite print-receiving sheet 22 adjacent the leading edge of apertrue 24.

The present invention comprehends products and apparatus including a pair of pressure-applying members and at least one and preferably two or more film assemblages of the type described positioned within the housing of the product or apparatus in position for exposure with leaders comprising the assemblage extending from the housing between the pressure-applying members. It is important that the leaders extend between the pressure-applying members so that the assemblages can be withdrawn, one at a time, between the members in direct contact with the members so that they apply compressive pressure directly to the photosensistive and print-receiving elements of each assemblage, and this pressure is not applied through the leaders of the other assemblages. Accordingly, the leaders of the assemblages are provided with openings or apertures in the regions thereof which extend between the pressure-applying portions of the members. Leader portions 70 and 72 of film assemblage 10 are provided with elongated apertures designated, respectively, 78 and 80 extending from side to side of carrier sheets 16 and 20 and being at least equal in length to the pressure-applying portions of the pressure-applying members. Apertures 78 and 80 may be rectangular as shown in Figs. 1 and 2 or wider at their mid portions and tapering toward their ends as shown in Fig. 3, so long as the pressure-applying portions of the pressure-applying members can extend into the openings without engaging the leader portions. This latter type of tapered opening (designated 78) is preferred since the edges of such an opening are less likely to engage or become caught on the edges of another opening or sheet during movement between the pressure-applying members. Leader portions 70 and 72 include, respectively, maginal portions 86 and 88 at the ends of the openings therein for connecting together sections of the leader portions on opposite sides of the opening.

The film assemblage of Fig. 4 is the type of film assemblage wherein the photosensitive and print-receiving elements are intended to remain in superposition during exposure and, accordingly, container 46 is located between leader portions 74 and 76 adjacent the leading edges of the photosensitive and second sheets and the two leader portions are attached to a single leader strip 82. Strip 82 may be a separate strip as shown or may comprise a section of one of leader portions 74 and 76. It is leader strip 82 that, in this form of assemblage, is provided with an elongated opening 84 for the pressure-applying members and marginal portions 90 at opposite ends of the opening.

Figure 7:
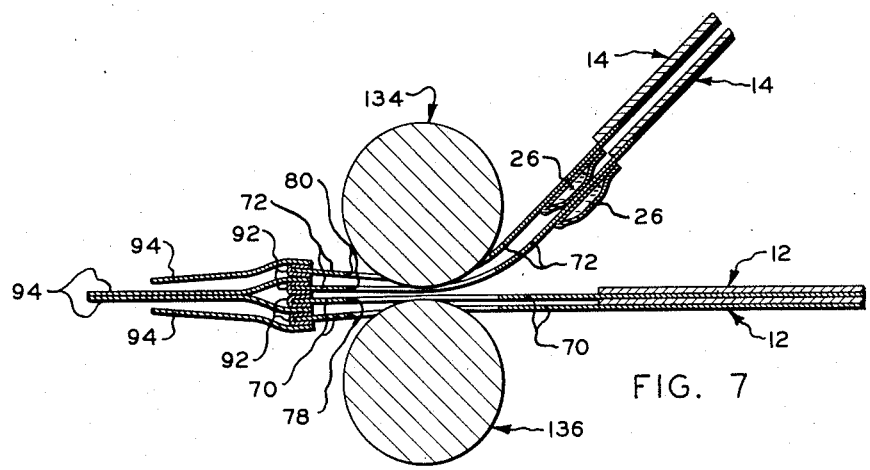
Fig. 7 is a diagrammatic sectional view illustrating the cooperation between the pair of pressure-applying members and the film assemblages of Fig. 1.

The arrangement of the leaders with respect to a pair of pressure-applying members, particularly rolls such as shown at 48 and 50 in Fig. 5 and at 134 and 136 in Fig. 7, is useful in photographic apparatus wherein the photosensitive and second sheets are separated during exposure, such as cameras shown, for example, in applications Serial Nos. 537,982, filed October 3, 1955, in the name of Edwin H. Land, and 636,650, filed January 28, 1957, in the name of Edwin H. Land et al. A plurality of photosensitive elements 12 are arranged in one stack with the photosensitive element of a first assemblage in position for exposure, and an equal number of print-receiving elements 14 are arranged in a second stack disposed at an angle with respect to the first stack of photosensitive elements. All of the leader portions 70 and 72 extend into superposition with one another between the pressure-applying rolls with the leaders of the first assemblage located innermost and together and with the leaders of subsequent assemblages disposed outwardly therefrom. The pressure-applying portions of the rolls project toward one another through openings 78 and 80 in the superposed leaders while marginal portions 70 and 72 extend adjacent and laterally of opposite ends of the rolls and serve to connect sections of the leaders located on opposite sides of the pressure-applying rolls. While the leaders of all the assemblages are shown as having openings therein, it is apparent that such openings can be omitted from the leaders of the first assemblage.

Marginal sections 86, 88 and 90 possess sufficient tensile strength so that the photosensitive and second elements can be drawn between the pressure-applying rolls for spreading the fluid processing reagent between the photosensitive and print-receiving sheets. It may be desirable, and it is entirely practical, to reinforce the marginal sections with a thin tear-resistant sheet material or lamina. Materials useful for this purpose are plastic materials which are thin and tough, "Mylar," a polyester film produced by E. I. du Pont de Nemours & Company, being particularly suited for this purpose. It is apparent, however, that if the sections of the leader portions on the leading side of the opening (projecting outside the pressure-applying members) were merely grasped for withdrawing an assemblage between the rolls, the tensive force would be imparted to the marginal sections unevenly. This, and in addition bending or flexing of the sheet material, would have a tendency to cause tearing of the leader portions. For this reason the leading edge of each of openings 78, 80 and 84 is provided with a relatively rigid element tending to resist bending and flexing of the sheets in the region of the openings to distribute more equally the tensive forces on marginal sections 86, 88 and 90 and assure that the forces on these sections are tensive and are applied along the plane of the sheets in the direction of elongation thereof and not in a direction tending to shear or tear the sheets. Instead of marginal sections 86, 88 and 90 of paper or sheet material and comprising portions of the leader sheets, the tabs could be connected to the leader sheets by other means such as wires, thin metal or plastic strips or the like.

This rigid reinforcing element may take the form shown in Figs. 1 and 2 and comprises a metal strip or channel member 92 clamped or crimped in engagement with the leading edge of the leader portion adjacent the leading edge of the opening therein. Metal channel 92 is relatively thin and small, yet appreciably stronger and more capable of resisting bending than the sheet material (preferably paper) of the leader portion to which it is attached. Channel member 92 extends substantially from side to side of the leader sheet and into engagement with each pair of marginal sections and may have another leader strip or tab 94 secured to its mid section. Tab 94 is more easily grasped for withdrawing an assemblage or element between the pressure-applying members. As a convenience for identifying and grasping leader tabs 94 of a succession of assemblages in their proper sequence, the leader tabs of each successive assemblage are equal in length to one another and shorter than those of the previous assemblage so that the operator need only remember to grasp the longest tab or pair of tabs and is assured thereby of withdrawing the proper assemblage. The leader tabs attached to the elements of each assemblage are of equal length and so arranged that when their ends are in alignment, the photosensitive and print-receiving sheets will be in registration when withdrawn between the pressure-applying members.

In the form of element shown in Fig. 3 and assemblage shown in Fig. 4, the functions of both reinforcing means and leader tab are combined in a single leader tab 96 formed of a relatively stiff material, such as cardboard, sheet plastic and the like. Tabs 94 and 96, in the form shown in Fig. 3, are generally symmetric and tapered to form isosceles triangles. Further modifications of the reinforcing means and leader tab are conceivable and are considered to be within the scope of the invention. For example, the leader tab may include lateral portions or members which extend along the edges of the leader sheets toward the trailing ends thereof at opposite ends of the openings therein so as to reinforce marginal sections 86, 88 and 90 or to take the place of these sections entirely. A sheet metal reinforcing member could be made in the shape of a U with the ends of the legs thereof attached to the leader portion so that they take the place of marginal sections 86, 88 and 90. Similarly, a tab such as shown at 96 could be provided with a pair of legs for performing the same function.

Figure 11:
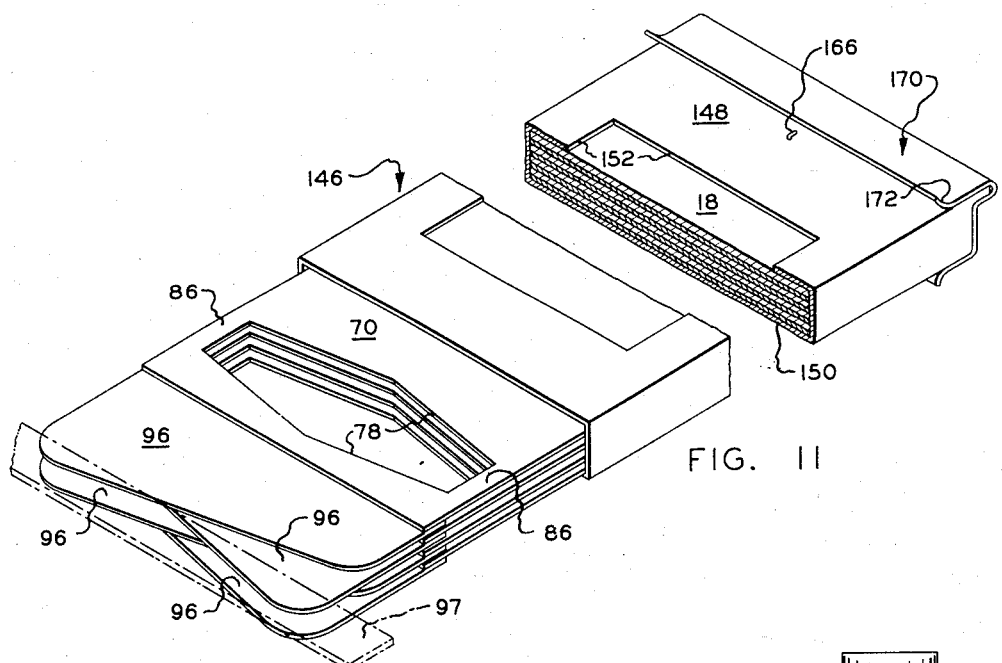
Fig. 11 is a diagrammatic perspective view, partially in section, of a product including elements of film assemblages.

Tabs 94 and 96, instead of being in the shape of generally symmetric isosceles triangles of different lengths as shown in Fig. 3, may be generally assymmetric in shape and in the form of right triangles as shown in Fig. 11. All the tabs would be of substantially the same length with alternate tabs with their longer portions opposite one another. This arrangement would permit the tabs to be folded back against the walls of the product or apparatus from which they project and be retained in place by suitable means such as bars 97 (shown in broken lines in Fig. 11) which extend transversely of the tabs in engagement with their leading ends. Tabs 96 attached to the photosensitive elements would be arranged and retained in one stack against the outer surface of one wall of the apparatus, and tabs 96 attached to the print-receiving elements would be similarly arranged in a separate stack against another wall. The two tabs of each assemblage could be readily disengaged from their respective bars 97 and grasped for withdrawing a pair of elements comprising the assemblage through and/or from the apparatus.

Figure 8:
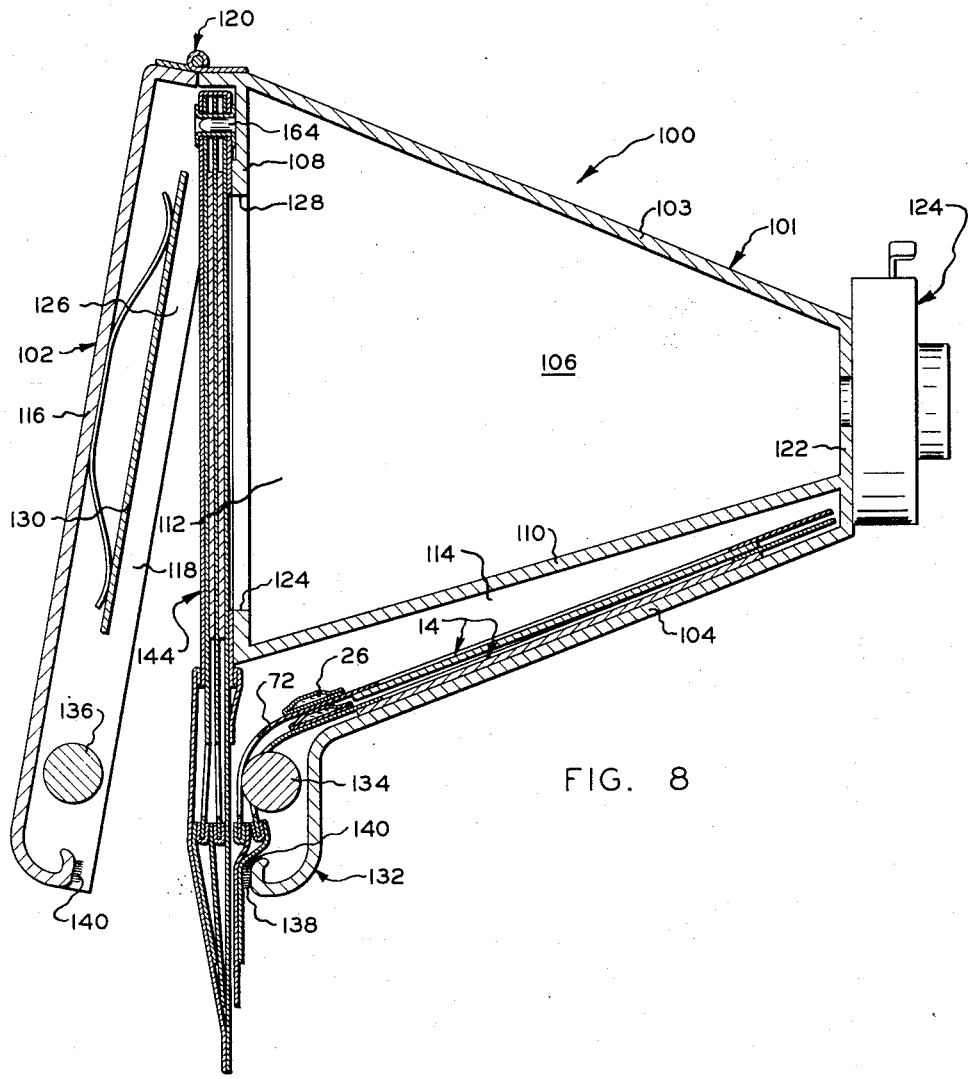
Fig. 8 is a diagrammatic sectional view of photographic apparatus in the form of a camera embodying the invention and for employing the film assemblages of the invention.

Film assemblages 10 may be provided in apparatus in the form of a camera, such as shown in Fig. 8 of the drawings. This camera, designated 100, comprises a housing including a forward section 101 and a rear section 102. Forward housing section 101 includes convergent upper and lower walls 103 and 104, side walls 106, a rear wall 108 and an inner lower wall 110 dividing the forward housing section into a convergent exposure chamber 112 and a storage chamber 114. The rear housing section 102 comprises a rear wall 116 and forwardly extending side walls 118 and is pivotally mounted at its upper portion on the forward housing section by hinge means 120. The camera housing includes a forward wall 122 having an exposure aperture therein and mounting a conventional photographic lens and shutter assembly 124. The expressions "upper," "lower" and "side" are used herein for purposes of illustration to facilitate describing the relative positions of the various elements comprising the camera structure as they appear in the drawings, and are not intended in a limiting sense.

Rear housing section 102 is pivotable rearwardly with respect to forward housing section 101 from a closed position, wherein rear walls 108 and 116 cooperate to provide a rear storage chamber 126 within which a plurality of photosensitive elements 12 are positioned for exposure. So that the photosensitive elements can be exposed within chamber 126, rear wall 108 is provided with an exposure aperture 128 through which light from the lens of assembly 124 may be transmitted to the foremost photosensitive element positioned for exposure against the rear surface of wall 108 which is preferably located in the focal surface of the lens. A conventional spring and pressure plate assembly 130 is provided mounted on rear wall 116 in chamber 126 for urging the photosensitive elements forwardly against rear wall 108 into position for exposure. Storage chamber 114 is provided with a plurality of second or print-receiving elements 14 adapted to be superposed with the photosensitive elements following exposure thereof.

The forward housing section includes a downwardly extending housing section 132 providing a chamber in which is mounted one of a pair of pressure-applying members, in the form shown comprising a roll 134. Suitable resilient means (not shown) are provided for urging roll 134 rearwardly. Rear housing section 102 carries another pressure-applying roll 136 mounted between side walls 118, and the two rolls may be of substantially the same constructions as rolls 48 and 50 shown in Figs. 5 and 6. The two housing sections may be pivoted apart to permit loading of a plurality of film assemblages into the camera with the leaders thereof extending between pressure-applying rolls 134 and 136. Rear section 102 is then pivoted forwardly into a closed position so that rolls 134 and 136 are juxtaposed with one another, suitable manually operable means (not shown) being provided for holding the housing sections together in closed position and the pressure-applying rolls in juxtaposition. Rear wall 116 and housing section 132 are so formed as to provide a passage or opening 138 therebetween below and adjacent the rolls through which the leaders attached to the film assemblages project and through which each film assemblage is withdrawn following exposure of the photosensitive element thereof. Means, such as felt or flocking 140, may be provided in passage 132 for engaging the leaders and film assemblages for sealing the passage against the admission of light, although this may not be necessary as the pressure-applying rolls function as light-sealing means and the photosensitive and print-receiving elements of the film assemblages could be opaque in this type of camera. Another form of light-sealing means may comprise a pair of rolls mounted in juxtaposition in passage 138 and having at least surface portions of a pliant material such as flocking, rubber or the like adapted to engage the film assemblages in a lighttight manner.

Camera 100 may be provided as a product containing a plurality of film assemblages and may be constructed of inexpensive materials so that it is readily expendable and may be discarded following exposure and processing of the assemblages initially provided therein. The construction of such a camera is disclosed in the copending application of Edwin H. Land et al., Serial No. 645,526, filed March 12, 1957. Alternatively, camera 100 may comprise a permanent reusable device adapted to be loaded with a plurality of film assemblages 10 and to be reloaded with these assemblages as they are exhausted. A camera for use with film assemblage 30 shown in Fig. 4 would, in one form, be similar in construction to camera 100 but much simpler inasmuch as there would be no necessity for storing a plurality of print-receiving elements apart from the photosensitive elements.

Figure 9:
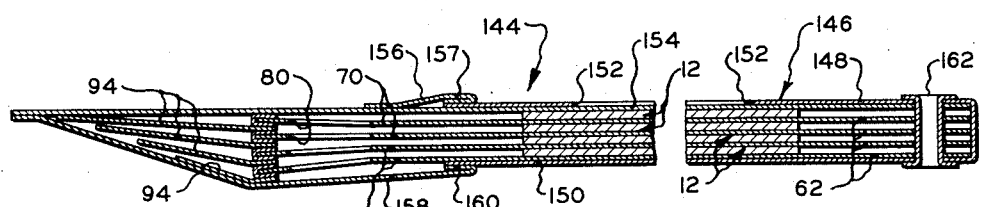
Fig. 9 is a diagrammatic sectional view showing a photographic product comprising elements of the film assemblage of Fig. 1.

A plurality of film assemblages 10 may be provided as part of a product or film pack adapted to be loaded into camera 100. Such a product would include at least one envelope for enclosing the photosensitive elements to protect them and prevent their being exposed. One embodiment of a product or film pack comprising a plurality of assemblages 10 is shown in part at 144 in Figs. 8 and 9 of the drawings. The portion of film pack 144 shown comprises a plurality of photosensitive elements 12 and an envelope 146 for enclosing the photosensitive elements which are arranged in stacked relation. Envelope 146, which is preferably formed of a thin sheet material such as paper or the like and is opaque to actinic light, includes a forward wall 148 and a rear wall 150 and has an opening in one end through which leaders 70 of photosensitive elements 12 project. Forward wall 148 is provided with an exposure aperture 152 overlying photosensitive sheets 18 and adapted to be registered with opening 128 of camera 100. Film pack 144 includes means for preventing light from entering envelope 146 through the open end thereof and through aperture 152 prior to loading of the film pack into a camera. This last-mentioned means comprises a light-opaque sheet or dark slide 154 which is located within the envelope immediately behind forward wall 148 and extends from the open end of the envelope. A pair of cover sheets, designated 156 and 158, are secured to the front and rear walls of the envelope in the region of the open end thereof, forward cover sheet 156 being secured to the portion of dark slide 154 projecting from the envelope, and cover sheet 158 extending rearwardly of leaders 70 and leader tabs 94 beyond the end of the longest leader tab where the cover sheet is attached to the end of dark slide 154. Cover sheets 156 and 158 are secured to one another at their margins and cooperate with one another and dark slide 154 to form a second envelope which projects exterior of envelope 146 and is secured thereto. The trailing edges of cover sheets 156 and 158 are folded inwardly upon themselves and these inner folds, designated, respectively, 157 and 160, are adhered to forward and rear walls 148 and 150, respectively, so that as dark slide 154 is withdrawn from the envelope after the film pack has been loaded into a camera, inner folds 157 and 160 will readily peel from the envelope so that the dark slide and cover sheets can be withdrawn from the camera.

The print-receiving elements of film pack 144 can be provided in a second envelope if desired. However, such an arrangement is not essential since the print-receiving elements are not photosensitive. Therefore, any convenient means for holding the print-receiving elements together and protecting them to the extent required, depending on the way the pack is to be handled, would be sufficient. A preferred means is an envelope and this envelope could be attached to envelope 146 adjacent the open end thereof as a matter of convenience for retaining all the photosensitive and second elements together.

As each photosensitive element 12 and print-receiving element 14 of a film assemblage are moved between a pair of pressure-applying members, each element, unless it is the only element remaining, will be moved in face-to-face contact with another element of the stack in which it is supplied. Friction will be generated between the moving element and the adjacent element which is not supposed to move, tending to cause the latter element to move. This is especially true in the case of photosensitive elements which are pressed against one another by spring means for locating the photosensitive elements in position for exposure and creates the problem of retaining all, but the photosensitive element to be processed, motionless and in position for exposure. There may be no such problem with the print-receiving elements inasmuch as there is no pressure on these elements, causing the generation of frictional forces tending to move the print-receiving element which is in contact with the moving element; and, in any event, the positioning of the print-receiving elements is not as important or critical as is the proper positioning of the photosensitive elements. Accordingly, means are provided as part of the film pack in the camera for retaining the photosensitive elements in proper position for exposure within the camera and releasing each element, one at a time, for withdrawal from the camera. The means which is part of the film pack may comprise, in the form shown in Fig. 9, a grommet 162. Grommet 162 is provided secured through the trailing end portion of envelope 146 and the trailing end portions 62 of the photosensitive elements within the envelope. The camera or other apparatus into which the pack is adapted to be loaded includes means such as pin 164 (see Fig. 8) for engaging the grommet and retaining it in place. The grommet is engaged in trailing end portions 62 as close as possible to the edges thereof as each of these sections is intended to tear when the photosensitive element which it comprises is withdrawn from the envelope and camera, the remaining elements being held in place by the grommet and pin.

The photosensitive elements, instead of being secured to the grommet which is engaged by means such as a pin in the camera, may be secured to envelope 146 which, in turn, is retained by suitable means in the camera. Trailing end portions 62 may be secured directly to the envelope by such means as a wire or staple 166, such as is shown in Figs. 11 and 12, and this construction may be preferable to a grommet since a thin wire will tear through the sheets more readily than the grommet.

Figure 13:
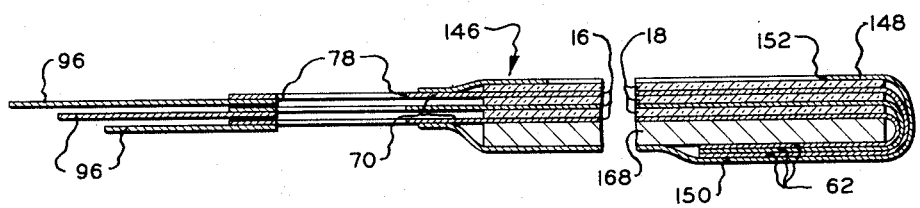
Figs. 13 and 14 are diagrammatic sectional views of other embodiments of the product of Fig. 11.

In still another form of film pack shown in Fig. 13, a relatively stiff backing sheet 168 is provided in envelope 146 behind the stack of photosensitive elements. The trailing end portions 62 of the photosensitive elements are folded around the end of backing sheet 168 between the backing sheet and rear envelope wall 150 and are secured by any suitable means to the backing sheet which, in turn, is secured to the rear wall of the envelope. Alternatively, the trailing end portions may be secured directly to the rear wall of the envelope instead of being secured to the backing sheet. This form of film pack is advantageous in that it is shorter than the others by approximately the length of trailing end portions 62, thereby allowing a corresponding decrease in the length of the storage chamber for the photosensitive elements and the overall size of the film pack and apparatus. An equivalent saving in size may be effected in the same manner by having trailing end portions 64 of the print-receiving elements folded around and behind a backing sheet.

Figure 14:
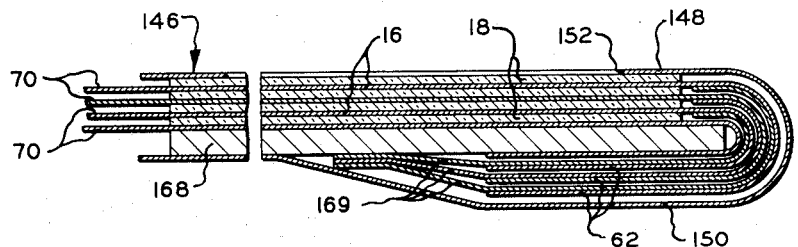

Another means for retaining photosensitive elements 12 within envelope 146 is illustrated in Fig. 14 of the drawings. This means includes a backing sheet 168 and a plurality of interleaf sheets 169 secured to the rear of the backing sheet and being of sufficient length to extend around the trailing end thereof. Trailing end portions 62 of the photosensitive elements are folded around and behind the trailing end of the backing sheet, and interleaf sheets 169 extend between each pair of end portions 62. This arrangement permits the ready movement of the foremost photosensitive element 12 and its withdrawal from envelope 146 while precluding the withdrawal of any but the foremost photosensitive element, and two elements at a time.

Figure 12:
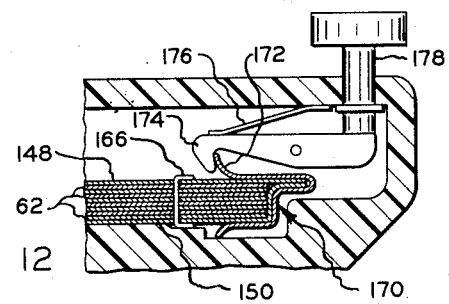
Fig. 12 is a diagrammatic sectional view illustrating the cooperation between photographic apparatus and the product of Fig. 11.

Another means for retaining the envelope in the camera and useful for envelopes of the above type to which the photosensitive elements are attached is illustrated in Figs. 11 and 12. This means comprises a generally channel-shaped element 170 preferably formed of relatively stiff but thin sheet metal and secured, as by crimping, to the trailing end of the envelope. Element 170 includes an outwardly curved edge portion 172 which projects forward above the surface of forward wall 148 and is engageable by suitable means comprising a part of the apparatus into which the envelope is loaded. This type of envelope and retaining element 170 is particularly suited for use in apparatus including a storage chamber for the photosensitive elements having only one opening at one end through which the photosensitive elements and envelope are introduced and withdrawn, and wherein there is not the complete access to the storage chamber that is afforded by the constructions shown in camera 100. The retaining means of the camera may comprise, for example, a pivotable latch member 174 biased by a spring 176 toward the envelope so as to engage edge portion 172 of element 170. Member 174 is constructed so as to be deflected automatically by engagement with element 170 during introductory movement of the film pack. A manually engageable push button 178 is provided for pivoting latch member 174 so as to disengage it from element 170, releasing the envelope so that it can be withdrawn when desired from the storage chamber.

Figure 15:
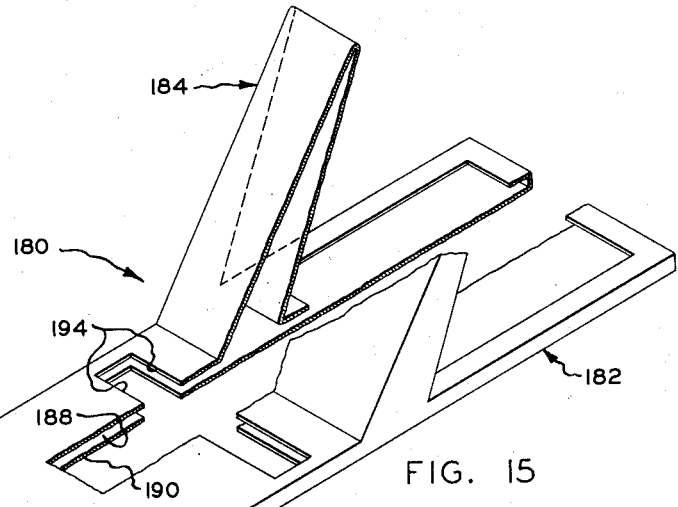
Fig. 15 is a diagrammatic fragmentary perspective view of an envelope arrangement for enclosing and processing assemblages of the invention.
Figure 16:
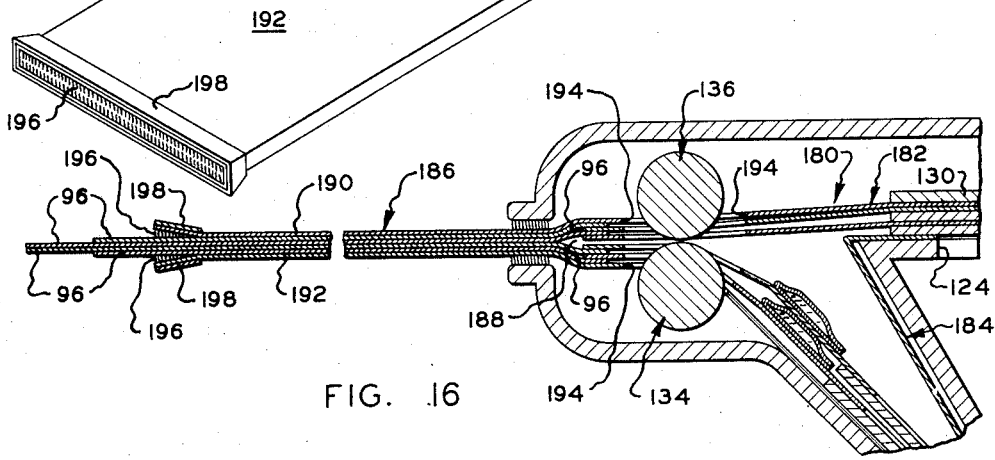
Fig. 16 is a diagrammatic sectional view illustrating the envelope arrangement of Fig. 15 and its manner of cooperation with the assemblages and photographic apparatus in the form of a camera such as shown in Fig. 8.

The film assemblage and packs thereof illustrated thus far have been of the type adapted to be withdrawn between the pressure-applying members directly into the light, the photosensitive and print-receiving elements being opaque to actinic light so that the photosensitive material is not exposed. Another type of film pack is illustrated in Figs. 15 and 16 and includes means providing a lighttight processing chamber into which each assemblage is drawn from between the pressure-applying members. This film pack, designated 180, comprises a first envelope 182 containing a plurality of photosensitive elements 12, means shown in the form of a second envelope 184 for containing a plurality of print-receiving elements 14 and a third envelope 186 providing a processing chamber 188. Envelope 186 is in the form of a flattened tube open at both ends and secured at one end to envelopes 182 and 184 and includes a front wall 190 and a rear wall 192 which may, in fact, comprise the same sheets as the walls of envelopes 182 and 184. Front and rear walls 190 and 192 have elongated transverse openings 194 therein located in alignment with the corresponding openings 78 and 80 in the leaders of the assemblages through which the pressure-applying rolls 48 and 50 project toward one another.

Leader tabs 96 extend completely through processing chamber 188 between walls 190 and 192 so that they can be grasped for drawing the assemblages between the pressure-applying rolls into and from the processing chamber. The walls of the housing of the product or apparatus in which the film assemblages are exposed and in which processing is commenced engage the walls of envelope 186, preventing the admission of light into the housing around the envelope. Suitable light-sealing means are provided at the outer end of the envelope for preventing the admission of light into processing chamber 188. This light-sealing means may comprise, for example, flocking or a pile fabric 196 secured to the inner surfaces of the marginal edge portions or lips of walls 190 and 192 adjacent the open end of the envelope and spring means 198 engaged around the open end of the envelope for urging the pile fabric or flocking 196 into engagement with the portions of the film assemblages extending from the envelope. Third envelope 186 is preferably formed of a flexible sheet material, such as a light-opaque paper or fabric, and is sufficiently flexible to accommodate more than one assemblage during processing and may be folded back against the housing so as to be out of the way.

Film assemblages 30 may be provided in a similar film pack including two envelopes attached to one another, one envelope enclosing a plurality of photosensitive elements 32 and print-receiving elements 34 and the second envelope providing the processing chamber through which leader tabs 96 extend and into which each film assemblage 30 may be drawn for processing.

Figure 17:
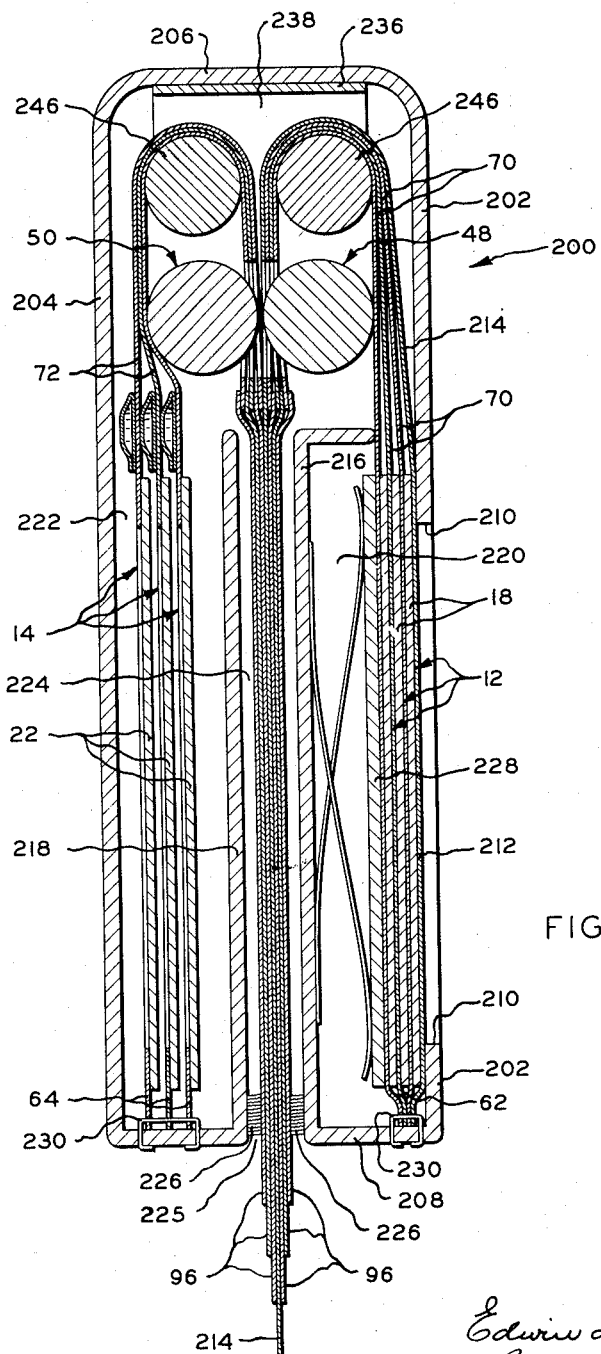
Fig. 17 is a somewhat diagrammatic sectional view of a magazine including a pair of pressure-applying members for enclosing, exposing and processing photographic assemblages embodying the invention.

Film assemblages 10 have been shown as being provided in apparatus in the form of a camera for exposing and processing the assemblages and as part of a film pack adapted to be loaded into such a camera or apparatus. The film assemblages may also be provided as part of a product in the form of a film magazine adapted to be attached to a camera and which may be discarded following use. Film magazines of this type may comprise a complete self-contained unit including means for processing the assemblages as well as storing them. A magazine of this type is shown in Fig. 17 of the drawings and includes a housing for storing and positioning the assemblages for exposure, pressure-applying means for spreading the fluid processing reagent within the assemblages and means providing a processing chamber. Magazines of this type may be adapted to function as a camera back adapted to be attached to suitable exposure means such as a lens and shutter assembly and means for operatively mounting the lens and shutter assembly with respect to the camera back.

A typical self-developing magazine is designated 200 and comprises an outer envelope or housing including a forward wall 202, a rear wall 204, an upper wall 206 and a lower wall 208 and side walls joining the forward and rear walls. Forward wall 202 is provided with an aperture 210 for transmitting light to photosensitive elements 12 positioned for exposure within the housing behind and against forward wall 202. The film magazine is provided with a dark slide 212 initially extending within the housing across and in closing relation to aperture 210. Dark slide 212 may be relatively stiff and of the type usually provided in conventional film packs and magazines and which may be both withdrawn and reinserted in the magazine; or would be, in the form shown, attached to a leader strip 214 and adapted only to be withdrawn from the housing after the film magazine has been coupled with a camera or other photographic apparatus. The magazine includes a forward inner wall 216 and a rear inner wall 218 dividing the magazine into three chambers designated a forward chamber 220 in which a plurality of photosensitive elements 12 are stored and positioned for exposure, a rear chamber 222 in which a plurality of print-receiving elements 14 are stored in stacked relation and an intermediate chamber 224 through which tabs 94 or 96, attached to the photosensitive and print-receiving elements, extend and into which a sandwich comprising a superposed photosensitive and print-receiving element with a layer of processing reagent therebetween is advanced for processing.

Lower wall 208 is provided with an opening or passage 225 communicating with intermediate chamber 224 and suitable light-sealing means, such as flocking or pile fabric 226, are provided in this opening for engaging leaders 94 and preventing the admission of light through opening 225 in chamber 224. A spring and pressure plate assembly 228 is provided mounted on wall 216 within chamber 220 for urging the photosensitive elements in said chamber forward against wall 202 into position for exposure. As a means for retaining the photosensitive and print-receiving elements within the magazine during withdrawal of one of the assemblages or during withdrawal of dark slide 212, means such as wires or staples 230 are provided for securing trailing end portions 62 and 64 of the film assemblages to lower wall 208.

The magazine includes a pressure-applying device comprising a pair of pressure-applying rolls 48 and 50 such as shown in Fig. 5 of the drawings. This device, designated 232, comprises a generally U-shaped frame or support member 234 having a transverse connecting section 236 and two dependent leg sections 238. Frame member 234 is preferably formed of a resilient sheet metal and each of leg sections 238 is divided by a slot into two portions, designated 240, which function as springs for biasing the pressure-applying rolls toward one another. Each of rolls 48 and 50 includes an axially projecting stepped shaft 242 at each end, the shafts being engaged for rotation in semi-circular recesses 244 in the inner opposed edges of leg portions 240. This construction is relatively simple and inexpensive since the frame member can be easily formed of sheet metal and functions both as a means for mounting the rolls in juxtaposition and as a spring means for biasing the rolls toward one another; and leg portions 240 comprising the spring for biasing the rolls toward one another are subject to only slight deformation or deflection when the film assemblage is drawn between the pressure-applying rolls. Pressure-applying device 232 is mounted within the magazine adjacent upper wall 206 and includes a pair of guide members in the form of rolls 246 mounted at their ends between leg sections 238 adjacent transverse section 236 for guiding the film assemblages around and between the pressure-applying rolls and reversing the direction of movement of the photo-sensitive and print-receiving elements of the film assemblages. While pressure-applying device 232 has been shown as including a pair of guide members in the form of rolls 246, other forms of the device are conceivable and are considered to be within the scope of the invention. For example, transverse section 236 may be provided with an elongated longitudinal slot so that the two parts of section 236 on either side of the slots function as the guide members. The edges of these two portions may be rolled or curved to facilitate drawing the sheets around said portions as well as to add strength and rigidity to the structure.

The photosensitive and print-receiving elements, in the form used in magazine 200, comprise extra-long leading end portions 70 and 72 in order to extend around guide rolls 246 and between pressure-applying rolls 48 and 50 into processing chamber 224. Pressure-applying rolls 48 and 50 project toward one another through openings 78 and 80 in the leading end portions. Leader tabs 96 are also extra long so as to extend through and from chamber 224 which is at least equal in length to the photosensitive and print-receiving sheets 18 and 22 and trailing end portions 62 and 64 attached thereto.

Magazine 200 is adapted to be attached or mounted with a camera or other photographic apparatus with forward wall 202 facing the lens and shutter or other exposure means of the apparatus. Exposure is made in the usual manner and the innermost pair of adjacent (and longest) leader tabs 94 are grasped and withdrawn through opening 225, drawing the film assemblage comprising said tabs between the pressure-applying members into chamber 224 wherein it may be allowed to remain for a predetermined processing period, at the end of which it is removed. Successive assemblages may be exposed and processed in the same manner and may be so comprised that they can be completely withdrawn from chamber 224 so that processing occurs outside the magazine since, in the form shown, only one assemblage at a time can be drawn into and processed within chamber 224.

A similar film magazine, designated 250, is illustrated in Fig. 18 and comprises a plurality of film assemblages 30. Film magazine 250 includes a forward wall 252, a rear wall 254, an upper wall 256, a lower wall 258 and side walls connecting the forward and rear walls. An intermediate wall 260 is provided for dividing the magazine into a forward exposure chamber 262 containing a plurality of film assemblages 30 located in position for exposure and a rear processing chamber 264 into which the assemblages are moved from between the pressure-applying members during processing. Forward wall 252 includes an aperture 266 through which light may be transmitted for exposing photosensitive sheets 38 positioned for exposure against the inner surface of forward wall 252 across aperture 266. A spring and pressure plate assembly 268 is provided mounted on intermediate wall 260 for urging film assemblages 30 forward against forward wall 252. Magazine 250 is provided with a pair of pressure-applying rolls 270 and 272 and a guide roll 274, which may be similar in construction to pressure-applying device 232, mounted in the upper portion of the magazine adjacent upper wall 256. Lower wall 258 is provided with an opening or passage 276 communicating with processing chamber 264. Leader strips 82 comprising film assemblages 30 extend around guide rolls 270 and 272, the pressure-applying rolls projecting toward one another through openings 84 in leader sheets 82 and leader tabs 96 extend into processing chamber 264 from the chamber through passage 276. Suitable means are provided in passage 276 for engaging the leader tabs and sealing the passage against the admission of light. Magazine 250 is employed in much the same way as magazine 200 and is adapted to be attached to or inserted into photographic apparatus such as a camera, and functions as a back for the camera. Magazine 250 includes a dark slide 278 located across aperture 266 and a leader 280 for withdrawing the dark slide from the magazine through passage 276 after the magazine has been attached to or inserted into the photographic apparatus with which it is to be employed.

Following exposure of a film assemblage 30 within the magazine, a leader tab 96, preferably the longest tab, is grasped for withdrawing the exposed film assemblage around guide roll 274 between pressure-applying rolls 270 and 272 into processing chamber 264 where it is allowed to remain for a predetermined processing period. In a magazine of this type employing film assemblages 30 each having only one leader tab 96, a succession of film assemblages 30 can be moved into chamber 264 and all can remain in there at the same time for processing.

Still another form of film magazine embodying film assemblages 30 is shown in Fig. 19 and is designated 282. Magazine 282 includes a forward wall 284 having an exposure aperture 286 therein, a rear wall 288, a lower wall 290 and side walls joining the forward and rear walls and comprising a single chamber 292 open at its upper end and enclosing a plurality of film assemblages 30 arranged in stacked relation. A spring and pressure plate assembly 294 is provided in chamber 292 on rear wall 288 for urging the film assemblages forward against wall 284 across aperture 286 in position for exposure. A pair of pressure-applying rolls 296 and 298 are provided in the upper portion of the magazine adjacent the open end thereof with leader sheets 82 extending between the rolls, the latter projecting toward one another through openings 84 in the leader strips, and with leader tabs 96 projecting from the magazine. Coupled with the upper portion of the magazine in surrounding relation to the opening therein is an open-ended envelope or flattened tube 300, similar in construction to envelope 186 shown in Fig. 15, and having a forward wall 302 and a rear wall 304. Envelope 300 is joined to the upper portion of the magazine in a lighttight manner and is provided with means, in the form of springs 306, secured on opposite sides of forward and rear walls 302 and 304 adjacent the upper open end of the envelope for urging the walls toward one another and flocking or pile fabric 308 on the inner surfaces of these portions of the walls for engaging the film assemblages in a lighttight manner. Leader tabs 96 extend through envelope 300 from the open end thereof whereby they may be grasped for drawing each film assemblage, following exposure, from chamber 292 into envelope 300 between forward and rear walls 302 and 304 wherein the film assemblage is maintained in a light-free environment during a predetermined processing period. Magazine 282 is also provided with a suitable dark slide initially located across aperture 286 and adapted to be withdrawn from chamber 292 after the magazine has been introduced into a camera. Envelope 300 is preferably formed of a flexible material such as a light-opaque paper or fabric which, if desired, may be folded against the rear wall 288 of the magazine where it will be out of the way.

Figure 20:
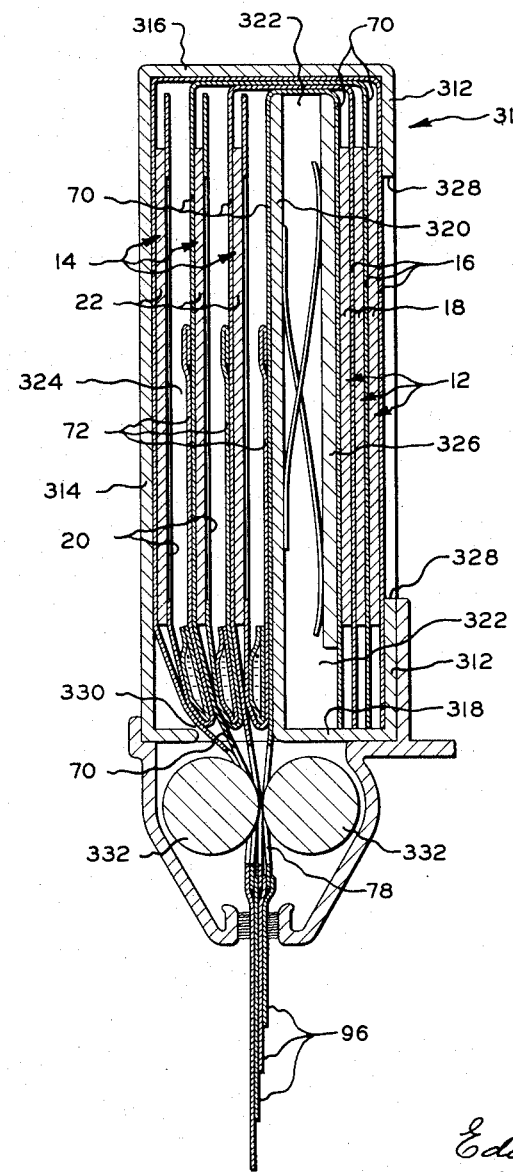

Reference is now made to Fig. 20 of the drawings wherein there is shown a magazine 310 comprising a plurality of photosensitive and print-receiving elements 12 and 14 positioned apart from one another for exposure and having only one leader tab 96 for the pair of photosensitive and print-receiving elements comprising each film assemblage 10. Magazine 310 may be of the type shown adapted to be coupled with apparatus including a pair of pressure-applying members, or it may itself include the pressure-applying members. Magazine 310 comprises a forward wall 312, a rear wall 314, an upper wall 316, a lower wall 318, side walls joining the other walls to form a housing and an intermediate wall 320 dividing the housing into a forward chamber 322 and a rear chamber 324, with a communicating passage adjacent upper wall 316. A plurality of photosensitive elements 12 are provided in stacked relation within forward chamber 322 along with a spring and pressure plate assembly 326 mounted on intermediate wall 320 for urging the photosensitive elements forward against wall 312 into position for exposure. Forward wall 312 includes an aperture 328 through which the photosensitive elements are exposed and the magazine is provided with a suitable dark slide arranged, such as previously described, for closing aperture 328.

A plurality of print-receiving elements 14 are provided in stacked relation in rear chamber 324 and lower wall 318 includes an opening 330 communicating with rear chamber 324 through which film assemblages, located within the magazine, may be withdrawn. The photosensitive element 12 of each film assemblage 10 includes a relatively long leading end portion 70 which extends from chamber 322 downward through chamber 324 in front of the print-receiving element 14 of the assemblage and from rear processing chamber 324 through opening 330 between pressure-applying rolls 332. These pressure-applying rolls, in the form shown, comprise elements of the apparatus with which the magazine is associated. However, in an alternative arrangement pressure-applying rolls 332 may be located within the magazine within chamber 324 which, of course, would then be longer to accommodate the rolls. Leading end portions 70 are provided with openings 78 through which the rolls project and have attached to their leading ends suitable leader tabs, designated 96. Each of leading end portions 72 of print-receiving elements 14 is somewhat shorter than its corresponding leading end portion 70 of the photosensitive element and extends upward between each print-receiving element 14 and leading end portion 70 to about the middle of chamber 324 where it is attached to the leading end portion 70. The lengths of leading end portions 70 and 72 are so related and leading end portion 72 has a sufficient amount of slack that, as the tab 96 of one of film assemblages 10 is drawn, moving the leading end portions 70 thereof through chamber 324 and the photosensitive sheet 18 thereof into chamber 324, the print-receiving element 14 of the assemblage remains stationary until the photosensitive and print-receiving sheets 18 and 22 are in registration; then both sheets are moved together between pressure-applying rolls 332. By virtue of this arrangement, there may be only one leader tab for each film assemblage even though the photosensitive and print-receiving elements thereof are located in separate chambers of the magazine during exposure.

Figure 21:
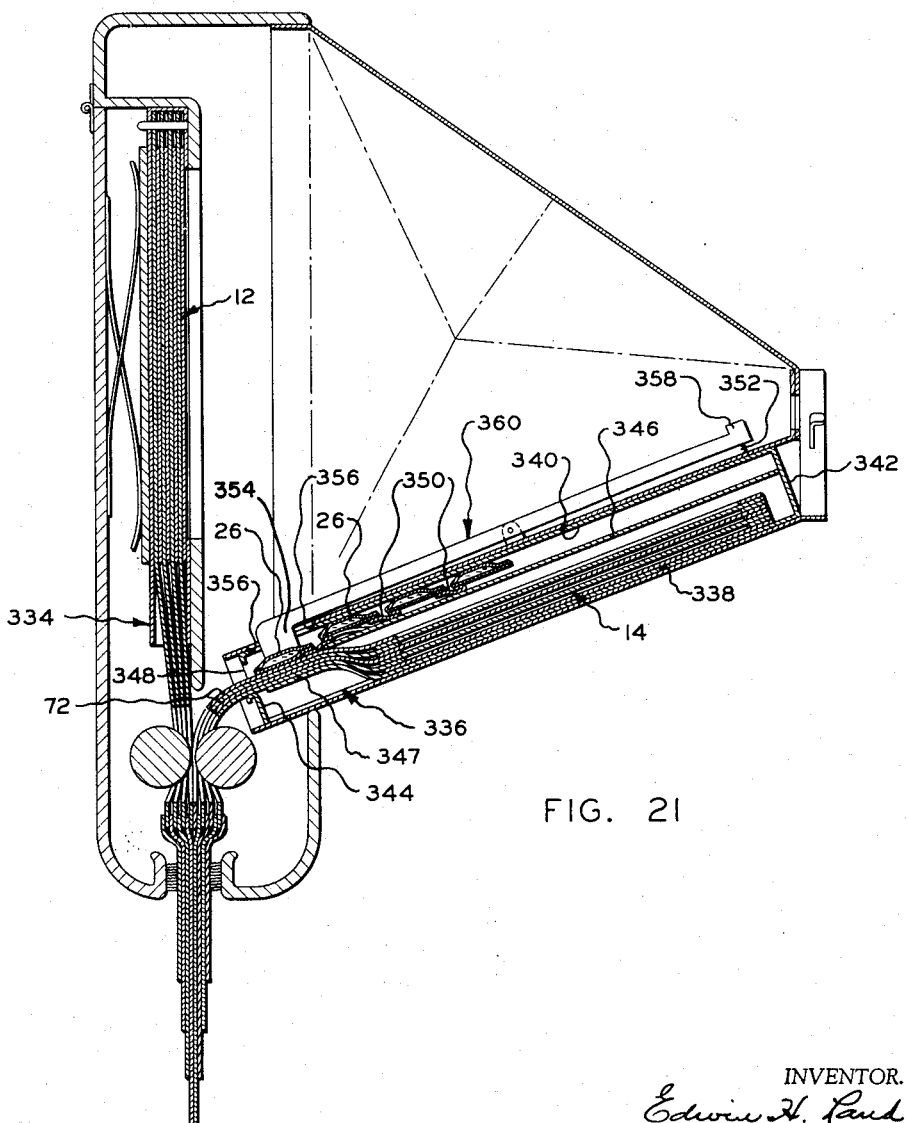
Fig. 21 is a somewhat diagrammatic sectional view of another form of camera and magazine embodying the invention.

Another form of photographic product and apparatus embodying the invention is illustrated in Fig. 21 of the drawings. This product may comprise a magazine which may or may not include a pair of pressure-applying members and may be adapted to be loaded into apparatus such as a camera or be associated with a lens and shutter assembly to form a camera as illustrated in the aforementioned application, Serial No. 636,650, or it may comprise a camera. This product is characterized by its thinness and includes a novel arrangement of the containers of fluid processing reagent whereby a stack of several print-receiving elements, and a plurality of containers associated therewith, have a thickness attributable to the thicknesses of the sheet materials and the thickness of only one container. In this product a plurality of photosensitive elements 12 are arranged in a first envelope or magazine 334 and a plurality of print-receiving elements 14 are arranged in stacked relation in a second envelope or magazine 336. The two envelopes or magazines may be loaded into or comprise two sections of a camera pivoted to one another and adapted to be pivoted apart for each exposure and then pivoted toward one another during processing.

Magazine 336 comprises a forward wall 338, a rear wall 340, end walls 342 and 344 and an intermediate wall 346 extending from end wall 342 toward end wall 344. End wall 344 is provided with an elongated slot 348 through which print-receiving elements 14 can be withdrawn from the magazine. Print-receiving elements 14 are located between forward wall 338 and intermediate wall 346 with leading end portions 72 extending through slot 348. A plurality of containers 26 are arranged adjacent one another between intermediate wall 346 and rear wall 340 and are connected to one another by strips or tabs 350 which are folded and adhered to the trailing and leading edges of successive containers so as to be strippable from the leading edge of each container. The first container, that is, the container located closest end wall 344, is secured to leading end portions 72 of the rearmost print-receiving element 14 and the remaining containers are provided on their forward surfaces, that is, the surfaces located adjacent intermediate wall 346, with a material which is strongly adherent to itself and has little affinity for other materials. The rear surfaces of leading end portions 72 of the remaining print-receiving elements are provided with the same self-adhesive material in the regions thereof underlying the first container. Forward wall 338 includes a rearwardly extending pressure plate or spring 347 for urging the print-receiving elements rearwardly toward rear wall 340 in the region of the first container so that each print-receiving element and container attached thereto must be drawn forward slightly in order to pass through slot 348 in end wall 344. Thus, as the rearmost print-receiving element and container attached thereto are drawn through slot 348, the remaining containers are moved toward end wall 344 until the second container engages end wall 344 and its movement is arrested. This second container is then in position to be adhered, by virtue of the self-adhesive material on it and the print-receiving element, to the second print-receiving element when the rearmost print-receiving element has been withdrawn from the magazine.

Means are provided for further insuring adherence of each container to the appropriate print-receiving element and, in the form shown, this means comprises a lever 350 pivotally mounted intermediate its ends either on rear wall 340 or a wall of the apparatus into which the magazine is introduced. A spring 352 is provided at one end of lever 350 for biasing the other end of the lever toward rear wall 340. This other end of the lever is provided with a pressure plate or plates 354 adapted to project through an opening or openings 356 in rear wall 340 for engaging and pressing each container against the leading end portion of the rearmost print-receiving element. The pressure plates and openings 356 may be so located as to engage the ends of the containers so as not to compress the fluid-carrying cavities thereof. As previously noted, magazines 334 and 336 are intended to comprise, or to be loaded into, a folding type camera which is employed to make an exposure with the two magazines located apart from one another at an angle and to effect the processing of a film assemblage when the two magazines are located adjacent one another. The one end of lever 350 is provided with a rearwardly projecting member 358 which is adapted, when the two magazine sections are pivoted toward one another, to be engaged by a portion of magazine 334 or a section of the camera containing said magazine for pivoting lever 350 against the bias of spring 352 and withdrawing pressure plates 354 from magazine 336 to permit the withdrawal of a print-receiving element from said magazine. Thereafter, when the two magazines are pivoted apart for another exposure, lever 350 is released and pressure plates 354 press the next successive container 26 against the leading end portion 72 of the rearmost print-receiving element.

While the fluid processing reagents have been shown and described as being supplied in rupturable containers adapted to be located between the sheets and moved therewith between the pressure-applying members, the invention is intended to comprehend the use of other means for supplying and dispensing the fluid processing reagent for spreading between the sheets by advancement of the sheets between the pressure-applying members. For example, the fluid may be provided and dispensed in accordance with the teaching of copending application Serial No. 522,605, filed July 18, 1955, in the name of Edwin H. Land.

The present invention finds utility in still another embodiment of film assemblage and apparatus. It this embodiment, each film assemblage comprises, instead of a single photosensitive element and a print-receiving element, two photosensitive elements adapted to be exposed in spaced-apart positions in apparatus for producing at least two color separation records. Each photosensitive element includes a support, a photosensitive layer and an image-receptive layer preferably located between the photosensitive layer and the support. The construction of each photosensitive element may be substantially the same as the photosensitive elements shown and described in my copending application Serial No. 614,983, filed October 9, 1956. The two photosensitive elements can be exposed simultaneously in spaced-apart relation in apparatus such as a camera including optical means such as a beam-splitting arrangement for producing two color separation records. Following exposure of the photosensitive elements, they are superposed with the photosensitive layers innermost and adjacent one another and drawn between a pair of pressure-applying members in substantially the same manner as described heretofore for spreading a fluid processing reagent from a container located between the elements in a layer between the photosensitive layers of the elements. The processing preferably involves the simultaneous formation of transfer images in the two image-receptive layers, following which the two elements are separated to allow the photosensitive layers and layer of fluid to be stripped from the image-receptive layers. Thereafter, the image-receptive layers, which may contain subtractive records, may be superposed to form a compositive positive color print.

Since certain changes may be made in the above apparatus and product without departing from the scope of the invention herein involved, it is intended that all matter contained in the above description or shown in the accompanying drawings shall be interpreted as illustrative and not in a limiting sense.

What is claimed is:

1. A photographic product for use in apparatus for exposing and thereafter processing photosensitive sheet materials, said apparatus including a pair of pressure-applying members between which said sheet materials are moved for effecting said processing, said product comprising, in combination, a plurality of photographic film assemblages adapted to be moved, one at a time, between said pressure-applying members, each of said assemblages comprising a photosensitive element adapted to be exposed in said apparatus, a second element adapted to be moved in superposition with said photosensitive element between said pressure-applying members, and leader means comprising at least one leader attached to at least one of said elements, said leader means extending between said pressure-applying members for drawing said photosensitive and second elements in superposition between said members, each leader of said leader means of at least all but the first of said assemblages to be drawn between said pressure-applying members having an opening therein in the region thereof intended to be located between said pressure-applying members whereby at least portions of said pressure-applying members project toward one another through said openings in said leader means of at least one of said assemblages for directly engaging the photosensitive and second elments of another of said assemblages during movement of the last-mentioned assemblage between said pressure-applying members.

2. A photographic product for use in apparatus for exposing and thereafter processing photosensitive sheet materials, said apparatus including a pair of pressure-applying members between which said sheet materials are moved for distributing a fluid processing agent over a predetermined area of said photosensitive sheet materials to effect said processing, said product comprising, in combination, at least one photographic film assemblage adapted to be moved between said pressure-applying members, said assemblage comprising a photosensitive sheet adapted to be exposed in said apparatus, a second sheet adapted to be moved in superposition with said photosensitive sheet between said pressure-applying members, and leader means comprising at least one leader attached to at least one of said sheets, said leader means extending between said pressure-applying members for drawing said photosensitive and second sheets in superposition between said members, each leader of said leader means having an opening therein in the region thereof intended to be located between said pressure-applying members whereby said pressure-applying members may directly engage the photosensitive and second sheets of another assemblage during movement of said other assemblage between said pressure-applying members, said opening in each of said leaders extending transversely of the leader and being at least equal in length to the width of the area of said photosensitive sheet over which a fluid processing agent is distributed by movement of said photosensitive sheet in superposition with a second sheet between said pressure-applying members.

3. A photographic product for use in apparatus for exposing and thereafter processing photosensitive sheet materials, said apparatus including a pair of pressure-applying members between which said sheet materials are moved for distributing a fluid processing agent over a predetermined area of said sheet materials to effect said processing, said product comprising, in combination, a plurality of film assemblages adapted to be moved, one at a time, between said pressure-applying members, each of said assemblages comprising a photosensitive element adapted to be exposed in said apparatus, a second element adapted to be moved in superposition with said photosensitive element between said pressure-applying members, and leader means comprising at least one leader attached to at least one of said elements, said leader means extending between said pressure-applying members for drawing said photosensitive and second elements in superposition between said pressure-applying members, each leader of said leader means of at least all but the first of said assemblages to be drawn between said pressure-applying members having an opening therein in the region thereof intended to be located between said pressure-applying members whereby at least portions of said pressure-applying members project toward one another through said openings in said leader means of at least one of said assemblages for directly engaging the photosensitive and second elements of another of said assemblages during movement of the last-mentioned assemblage between said pressure-applying members, each of said openings extending transversely of the leader and being at least equal in length to the width of the area of said photosensitive elements over which a fluid processing agent is distributed by movement of said photosensitive element in superposition with a second element between said pressure-applying members.

4. The photographic product of claim 3 wherein said openings in said leaders are generally rectangular.

5. The photographic product of claim 3 wherein said openings in said leaders are elongated and taper toward their ends.

6. A photographic product for use in apparatus for exposing and thereafter processing photosensitive sheet materials, said apparatus including a pair of pressure-applying members between which said sheet materials are moved for effecting said processing, said product comprising, in combination, a plurality of photographic film assemblages adapted to be moved, one at a time, between said pressure-applying members, each of said assemblages comprising a photosensitive element adapted to be exposed in said apparatus, a second element adapted to be moved in superposition with said photosensitive element between said pressure-applying members, and leader means comprising at least one leader attached to at least one of said elements, said leader means extending between said pressure-applying members for drawing said photosensitive and second elements in superposition between said members, each leader of said leader means of at least all but the first of said assemblages to be drawn between said pressure-applying members having an opening therein in the region thereof intended to be located between said pressure-applying members whereby at least portions of said pressure-applying members project toward one another through said openings in said leader means of at least one of said assemblages for directly engaging the photosensitive and second elements of another of said assemblages during movement of the last-mentioned assemblage between said pressure-applying members, and means for retaining at least said photosensitive elements of said assemblages in stacked relation with the areas thereof adapted to be exposed in substantial registration and with said openings in said leader means so aligned with one another as to permit said portions of said pressure-applying members to project toward one another through said openings.

7. A photographic product for use in apparatus for exposing and thereafter processing photosensitive sheet materials, said apparatus including a pair of pressure-applying members between which said sheet materials are moved for distributing a fluid processing agent over a predetermined area of said sheet materials for effecting said processing, said product comprising, in combination, a plurality of photographic film assemblages adapted to be moved, one at a time, between said pressure-applying members, each of said assemblages comprising a photosensitive element adapted to be exposed in said apparatus, a second element adapted to be moved in superposition with said photosensitive element between said pressure-applying members and leader means comprising at least one leader, attached to at least one of said photosensitive and second elements, said leader means being adapted to extend between said pressure-applying members and provide means for drawing at least said photosensitive and second elements between said pressure-applying members, each leader of said leader means having an elongated opening therein extending from side to side thereof in the region of said leader intended to be located between said pressure-applying members and including stiffening means located adjacent one side of said opening for resisting transverse flexure of said leader in the region of said opening and evenly distributing tensive forces on the portions of said leader comprising the margins thereof located at the ends of said opening, said opening being at least equal in length to the width of the area of said photosensitive element adapted to be exposed over which a fluid processing agent is distributed by movement of said photosensitive element in superposition with a second element between said pressure-applying members, said assemblages being retained together with said openings in said leaders so located with respect to one another as to permit said pressure-applying members to project toward one another through said openings for directly engaging the photosensitive and second elements of one of said assemblages during movement of an assemblage between said pressure-applying members.

8. The photographic product of claim 7 wherein said stiffening means of each of said leaders comprises a member secured to said leader adjacent the side of said opening remote from the element attached to said leader and extending transversely of said leader substantially from edge to edge thereof.

9. Photographic apparatus for holding photosensitive sheet materials for exposure and thereafter processing said sheet materials, said apparatus comprising, in combination, a plurality of film assemblages, means for housing said assemblages, a pair of pressure-applying members biased toward one another, and an opening in said housing means through which at least portions of said assemblages can be withdrawn, at least one of said film assemblages comprising a photosensitive element adapted to be photoexposed, means within said housing for positioning said photosensitive element for exposure, a second element adapted to be moved in superposition with said photosensitive element between said pressure-applying members, and leader means comprising at least a leader attached to at least one of said elements extending between said pressure-applying members and being manually engageable for drawing at least one of said photosensitive and second elements of said assemblage between said pressure-applying members, each leader of said leader means having an opening therein in the region thereof extending betwen said pressure-applying members, said opening being at least equal in length to at least portions of said pressure-applying members whereby said portions of said pressure-applying members may project toward one another through said opening in at least one of said leaders into direct engagement with the photosensitive and second elements of another assemblage during movement thereof between said pressure-applying members.

10. The photographic apparatus of claim 9 wherein said opening in each said leader is generally rectangular.

11. The photographic apparatus of claim 9 wherein said openings in said leaders are elongated and taper toward their ends.

12. Photographic apparatus for holding photosensitive sheet materials for exposure and thereafter processing said sheet materials, said apparatus comprising, in combination, a plurality of film assemblages, a pair of pressure-applying members biased toward one another, each of said assemblages comprising a photosensitive element having an area adapted to be photoexposed, a second element adapted to be moved in superposition with said photosensitive element between said pressure-applying members for distributing a fluid processing agent over said area of said photosensitive element, and leader means comprising at least a leader attached to at least one of said elements extending between said pressure-applying members and being manually engageable for drawing at least one of said photosensitive and second elements of each assemblage between said pressure-applying members, each leader of said leader means of at least all but the first of said assemblages to be drawn between said pressure-applying members having an opening in the region of said leader extending between said pressure-applying members, said opening being at least equal in length to the width of said area of said photosensitive element and the length of at least portions of said pressure-applying members whereby said portions of said pressure-applying members may project toward one another through said opening in at least one of said leaders into direct engagement with the photosensitive and second elements of another assemblage during movement thereof between said pressure-applying members, means for housing said assemblages with said photosensitive elements in stacked relation with at least one of said photosensitive elements in position for exposure and with said areas thereof in substantial registration and with said openings in said leaders sufficiently aligned so that said portions of said pressure-applying members project toward one another through said openings, and an opening in said housing means through which at least portions of said assemblages can be withdrawn, one at a time, from said housing means.

13. Photographic apparatus for holding photosensitive sheet materials for exposure and thereafter processing said sheet materials, said apparatus comprising, in combination, a plurality of film assemblages, means for housing said assemblages and positioning said assemblages for exposure, a pair of pressure-applying members biased toward one another, and an opening in said housing means through which at least portions of said assemblages can be withdrawn, each of said film assemblages comprising a photosensitive element including an area adapted to be photoexposed in said housing, a second element adapted to be moved in superposition with said photosensitive element between said pressure-applying members to effect the processing of said photosensitive element by a fluid agent distributed in a layer on said area, and leader means comprising at least a leader attached to at least one of said elements extending between said pressure-applying members and from said housing means through said opening so as to be manually engageable for drawing at least one of said photosensitive and second elements of said assemblage between said pressure-applying members, each leader of said leader means having an elongated opening therein extending from side to side thereof in the regions of said leader extending between said pressure-applying members, said opening being at least equal in length to the width of said area and the length of at least portions of said pressure-applying members whereby said pressure-applying members project toward one another through said openings in said leaders and are directly engageable with the photosensitive and second elements of one of said assemblages during movement thereof between said pressure-applying members, each of said leaders of said leader means including stiffening means located adjacent one side of said opening for resisting transverse flexure of said leader in the region of said opening and for more evenly distributing tensive forces on the portions of said leader comprising the margins of said leader located at the ends of said opening.

14. The photographic apparatus of claim 13 wherein said stiffening means of each of said leaders comprises a member secured to said leader adjacent the side of said opening remote from the element attached to said leader and extending transversely of said leader substantially from edge to edge thereof.

15. A photographic product for use in apparatus for exposing and processing photosensitive sheet materials, said apparatus including a pair of pressure-applying members between which said sheet materials are moved for effecting said processing, said product comprising, in combination, a plurality of photographic film assemblages adapted to be moved, one at a time, between said pressure-applying members, each of said assemblages comprising a photosensitive element, a second element adapted to be moved in superposition with said photosensitive element between said pressure-applying members, and leader means comprising at least one leader attached to at least one of said photosensitive and second elements, each leader of said leader means comprising a first section attached to said one of said elements and adapted to be located to one side of said pressure-applying members, a second section adapted to be located on the opposite side of said pressure-applying members, and a pair of spaced-apart connecting elements joining said first and second sections and extending between portions of said pressure-applying members at opposite ends of other portions of said pressure-applying members, each of said second sections of said leaders being manually engageable for drawing at least one of said photosensitive and second elements between said pressure-applying members, said spaced-apart connecting elements being so positioned and arranged that said other portions of said pressure-applying members can project toward one another between said first and second sections and said spaced-apart elements of said film assemblages and directly engage the photosensitive and second elements of one of said assemblages during movement thereof between said pressure-applying members.

16. A photographic product for use in apparatus for exposing and processing photosensitive sheet materials, said apparatus including a pair of pressure-applying members between which said sheet materials are moved for distributing a fluid processing agent over a predetermined area of said photosensitive sheet materials to effect said processing, said product comprising, in combination, at least one photographic film assemblage adapted to be moved between said pressure-applying members, said assemblage comprising a photosensitive sheet adapted to be exposed in said apparatus, a second sheet adapted to be moved in superposition with said photosensitive sheet between said pressure-applying members, and leader means comprising at least one leader attached to at least one of said sheets, said leader means being adapted to extend between said pressure-applying members for drawing said photosensitive and second sheets in superposition between said members, each leader of said leader means comprising a first section attached to said one of said sheets and adapted to be located to one side of said pressure-applying members, a second section adapted to be located on the opposite side of said pressure-applying members, and a pair of connecting elements joining said first and second sections and being adapted to extend between portions of said pressure-applying members at opposite ends of other portions of said pressure-applying members, said connecting elements being spaced apart by a distance at least equal to the width of said area of said photosensitive sheet over which a fluid processing agent is distributed by movement of said photosensitive sheet in superposition with a second sheet between said pressure-applying members whereby said other portions of said pressure-applying members may directly engage the photosensitive and second sheets of another assemblage during movement of said other assemblage between said pressure-applying members.

17. A photographic product for use in apparatus for exposing and processing photosensitive sheet materials, said apparatus including a pair of pressure-applying members between which said sheet materials are moved for distributing a fluid processing agent over a predetermined area of said sheet materials to effect said processing, said product comprising, in combination, a plurality of film assemblages adapted to be moved, one at a time, between said pressure-applying members, each of said assemblages comprising a photosensitive sheet adapted to be exposed in said apparatus, a second sheet adapted to be moved in superposition with said photosensitive sheet between said pressure-applying members, and leader means comprising at least one leader attached to at least one of said sheets and adapted to extend between said pressure-applying members for drawing said photosensitive and second sheets in superposition between said pressure-applying members, each leader of said leader means of at least all but the first of said film assemblages to be drawn between said pressure-applying members comprising a first section attached to said one of said sheets and adapted to be located to one side of said pressure-applying members, a second section adapted to be locate on the opposite side of said pressure-applying members, and a pair of connecting elements joining said first and second sections and adapted to extend between portions of said pressure-applying members at opposite ends of other portions of said pressure-applying members, said connecting elements being spaced apart by a distance at least equal to the width of said area of said photosensitive sheets over which a fluid processing agent is distributed by movement of said photosensitive sheet in superposition with a second sheet between said pressure-applying members whereby at least said other portions of said pressure-applying members may project toward one another between said first and second sections and said spaced-apart connecting elements of said leaders and directly engage the photosensitive and second sheets of one of said assemblages during movement thereof between said pressure-applying members.

18. The photographic product of claim 17 wherein the ends of said first and second sections of each of said leaders located closest one another are substantially straight and parallel.

19. The photographic product of claim 17 wherein the ends of said first and second sections of each of said leaders located closest one another are curved away from one another intermediate their ends.

20. A photographic product for use in apparatus for exposing and processing photosensitive sheet materials, said apparatus including a pair of pressure-applying members between which said sheet materials are moved for distributing a fluid processing agent over a predetermined area of said sheet materials to effect said processing, said product comprising, in combination, a plurality of film assemblages adapted to be moved, one at a time, between said pressure-applying members, each of said assemblages comprising a photosensitive sheet adapted to be exposed in said apparatus, a second sheet adapted to be moved in superposition with said photosensitive sheet between said pressure-applying members, and leader means comprising at least one leader attached to at least one of said sheets and adapted to extend between said pressure-applying members for drawing said photosensitive and second sheets in superposition between said pressure-applying members, each leader of said leader means of at least all but the first of said film assemblages to be drawn between said pressure-applying members comprising a first section attached to said one of said sheets and adapted to be located to one side of said pressure-applying members, a second section adapted to be located on the opposite side of said pressure-applying members, and a pair of connecting elements joining said first and second sections and adapted to extend between portions of said pressure-applying members at opposite ends of other portions of said pressure-applying members, said connecting elements being spaced apart by a distance at least equal to the width of said area of said photosensitive sheets over which a fluid processing agent is distributed by movement of said photosensitive sheet in superposition with a second sheet between said pressure-applying members whereby at least said other portions of said pressure-applying members may project toward one another between said first and second sections and said spaced-apart connecting elements of said leaders and directly engage the photosensitive and second sheets of one of said assemblages during movement thereof between said pressure-applying members, and means for retaining at least said photosensitive sheets of said assemblages in stacked relation with the areas thereof adapted to be exposed in substantial registration and with said openings in said leader means defined by said sections of said leaders and said connecting elements so aligned with one another as to permit said other portions of said pressure-applying members to project toward one another through said openings.

21. A photographic product for use in apparatus for exposing and thereafter processing photosensitive sheet materials, said apparatus including a pair of pressure-applying members between which said sheet materials are moved for distributing a fluid processing agent over a predetermined area of said sheet materials for effecting said processing, said product comprising, in combination, a plurality of photographic film assemblages adapted to be moved, one at a time, between said pressure-applying members, each of said assemblages comprising a photosensitive element adapted to be exposed in said apparatus, a second element adapted to be moved in superposition with said photosensitive element between said pressure-applying members, and leader means comprising at least one leader attached to at least one of said photosensitive and second elements, each leader of said leader means comprising a first section attached to said one of said elements, a second section, a pair of spaced-apart connecting elements joining said first and second sections and adapted to extend between portions of said pressure-applying members on opposite ends of other portions of said pressure-applying members, and stiffening means secured to one of said sections adjacent the edge thereof closest the other of said sections and extending into engagement with each of said connecting elements for resisting transverse flexure of said section in the region of said end and evenly distributing tensive forces on said connecting elements, said connecting elements being spaced apart from one another by a distance at least equal to the width of said area over which said fluid agent is to be distributed so that said other portions of said pressure-applying members can project toward one another between said first and second sections of said spaced-apart connecting elements of said film assemblages for directly engaging the photosensitive and second elements of one of said assemblages during movement thereof between said pressure-applying members.

22. A photographic product for use in apparatus for exposing and processing photosensitive sheet materials, said apparatus including a pair of pressure-applying members between which said sheet materials are moved for distributing a fluid processing agent over a predetermined area of said sheet materials for effecting said processing, said product comprising, in combination, a plurality of photographic film assemblages adapted to be moved, one at a time, between said pressure-applying members, each of said assemblages comprising a photosensitive element, a second element adapted to be moved in superposition with said photosensitive element between said pressure-applying members following exposure thereof, and leader means comprising at least one leader attached to at least one of said photosensitive and second elements, each leader of said leader means comprising a first section attached to said one of said elements and adapted to be located to one side of said pressure-applying members, a second section adapted to be located on the other side of said pressure-applying members, a pair of spaced-apart connecting elements joining said first and second sections and adapted to extend between portions of said pressure-applying members on opposite ends of other portions of said pressure-applying members, each of said second sections of said leaders being manually engageable for drawing at least one of said photosensitive and second elements between said pressure-applying members, said spaced-apart elements being located at the lateral margins of said leaders and spaced apart by a distance at least equal to the width of said area over which said fluid agent is distributed so that said other portions of said pressure-applying members can project toward one another between said first and second sections and said spaced-apart connecting elements of said film assemblages for directly engaging the photosensitive and second elements of one of said assemblages during movement thereof between said pressure-applying members, and stiffening means secured to one of said first and second sections of each of said leaders for resisting transverse flexure of said section of said leader and for evenly distributing tensive forces on said spaced-apart connecting elements, said stiffening means extending transversely of said one section of said leader and engaging said spaced-apart connecting elements.

23. Photographic apparatus for holding photosensitive sheet materials for exposure and thereafter processing said sheet materials, said apparatus comprising, in combination, a plurality of film assemblages, a pair of pressure-applying members biased toward one another, each of said film assemblages comprising a photosensitive element, a second element adapted to be moved in superposition with said photosensitive element between said pressure-applying members to effect the processing of said photosensitive element following exposure thereof, and leader means comprising at least a leader attached to at least one of said photosensitive and second elements, means for mounting and housing said assemblages with the photosensitive element of at least one of said assemblages in position for exposure and with the leaders of said assemblages extending from said housing between said pressure-applying members, each of said leaders comprising a first section attached to one of said elements and located on the inside of said pressure-applying members, a second section located on the opposite side of said pressure-applying members, and a pair of spaced-apart connecting elements joining said first and second sections at their lateral margins and extending between portions of said pressure-applying members at opposite ends of other portions of said pressure-applying members whereby said other portions of said pressure-applying members can project toward one another between said first and second sections and connecting elements for directly engaging the photosensitive and second elements of one of said assemblages during movement thereof between said pressure-applying members and the leaders of other of said assemblages.

24. A photographic product for use in apparatus for exposing and thereafter processing photosensitive sheet materials, said apparatus including a pair of pressure-applying members between which said sheet materials are moved for distributing a fluid processing agent over a predetermined area of said sheet materials to effect said processing, said product comprising, in combination, a plurality of photographic film assemblages adapted to be moved, one at a time, between said pressure-applying members, each of said assemblages comprising a photosensitive element, a second element adapted to be moved in superposition with said photosensitive element between said pressure-applying members following exposure of said photosensitive element to effect the processing thereof, and leader means comprising a pair of leaders, each attached to one of said photosensitive and second elements, for drawing said photosensitive and second elements between said pressure-applying members, each of said leaders having an opening therein in the region thereof intended to be located between said pressure-applying members whereby at least portions of said pressure-applying members may project toward one another through said openings in said leaders for directly engaging the photosensitive and second elements of one of said assemblages during movement of said assemblage between said pressure-applying members and said leaders, said opening in each of said leaders extending transversely thereof and being at least equal in length to the width of the area of said photosensitive element over which a processing agent is distributed by movement of said photosensitive element in superposition with a second element between said pressure-applying members.

25. The photographic product of claim 24 wherein the opening in each of said leaders of said film assemblages is elongated and extends from side to side thereof, and each of said leaders includes stiffening means located adjacent at least one side of said opening for resisting transverse flexure of said leader in the region of said opening and for evenly distributing tensive forces exerted on the portions of said leader comprising the lateral margins of said leader located at the ends of said opening.

26. Photographic apparatus for holding photosensitive sheet materials for exposure and thereafter processing said sheet materials, said apparatus comprising, in combination, a plurality of film assemblages, a pair of pressure-applying members biased toward one another, each of said assemblages comprising a photosensitive element adapted to be photoexposed, a second element adapted to be moved in superposition with said photosensitive element between said pressure-applying members to effect the processing of said photosensitive element following exposure thereof and leaders means comprising a pair of leaders, each attached to one of said photosensitive and second elements, and housing means for enclosing and mounting said assemblages with the photosensitive and second elements thereof separated from one another and with said leaders extending in superposition between said pressure-applying members to provide manually engageable means whereby the photosensitive and second elements of each assemblage can be drawn in superposition between said pressure-applying members, said leaders having openings therein in the regions thereof extending between said pressure-applying members whereby at least portions of said pressure-applying members project toward one another through said openings in said leaders and are directly engageable with the photosensitive and second elements of one of said assemblages during movement thereof between said pressure-applying members and the leaders of other of said assemblages.

27. The photographic apparatus of claim 26 wherein the opening in each of said leaders of said film assemblages is elongated and extends from side to side thereof, and each of said leaders includes stiffening means located adjacent at least one side of said opening for resisting transverse flexure of said leader in the region of said opening and for evenly distributing tensive forces exerted on the portions of said leader comprising the lateral margins of said leader located at the ends of said opening.

28. A photographic product for use in apparatus for exposing and processing photosensitive sheet materials, said apparatus including a pair of pressure-applying members between which said sheet materials are moved for distributing a fluid processing agent over a predetermined area of said sheet materials to effect said processing, said product comprising, in combination, a plurality of photographic film assemblages intended to be moved, one at a time, between said pressure-applying members, each of said assemblages comprising a photosensitive element, a second element adapted to be moved in superposition with said photosensitive element following exposure thereof between said pressure-applying members to effect the processing of said photosensitive element, and leader means comprising a pair of leaders each attached to one of said photosensitive and second elements, each of said leaders comprising a first section attached to one of said elements and adapted to be located to one side of said pressure-applying members, a second section adapted to be located on the opposite side of said pressure-applying members and a pair of spaced-apart connecting elements joining said first and second sections adjacent the lateral edges thereof and adapted to extend between portions of said pressure-applying members at opposite ends of other portions of said pressure-applying members, said second sections of said leaders providing means manually engageable for drawing said photosensitive and second elements between said pressure-applying members, said connecting elements being spaced apart by a distance at least equal to the width of the area of said photosensitive element adapted to be exposed and having a processing agent distributed thereon whereby said other portions of said pressure-applying members are capable of projecting toward one another between said first and second sections and said spaced-apart elements of said film assemblages for directly engaging the photosensitive and second elements of one of said assemblages during movement thereof between said pressure-applying members and the leaders of other of said assemblages.

29. The photographic product of claim 28 wherein said second section of each of said leaders is provided with stiffening means located adjacent the edge of said second section in engagement with said connecting elements for resisting transverse flexure of said second section and for uniformly distributing tensive forces transmitted by said connecting elements from said second section to said first section.

30. A photographic product for use in apparatus for exposing and thereafter processing photosensitive sheet materials, said apparatus including a pair of pressure-applying members between which said sheet materials are moved for effecting said processing, said product comprising, in combination, a plurality of photographic film assemblages adapted to be moved, one at a time, between said pressure-applying members, each of said assemblages comprising a photosensitive element adapted to be exposed in said apparatus, a second element adapted to be moved in superposition with said photosensitive element between said pressure-applying members to effect the distribution of a fluid processing agent over a predetermined area of said photosensitive element, and leader means comprising a single leader, attached to said photosensitive and second elements, adapted to extend between said pressure-applying members and provide means for drawing said photosensitive and second elements between said members, said leaders having openings therein in the regions thereof adapted to be located between said pressure-applying members, said openings being at least equal in length to the width of said area of said photosensitive element whereby at least portions of said pressure-applying members project toward one another through said openings in said leaders for directly engaging the photosensitive and second elements of one of said assemblages during movement of said one assemblage between said pressure-applying members.

31. The photographic product of claim 30 wherein the opening in each of said leaders of said film assemblages is elongated and extends from side to side thereof, and each of said leaders includes stiffening means located adjacent at least one side of said opening for resisting transverse flexure of said leader in the region of said opening and for evenly distributing tensive forces exerted on the portions of said leader comprising the lateral margins of said leader located at the ends of said opening.

32. Photographic apparatus for holding photosensitive sheet materials for exposure and thereafter processing said sheet materials, said apparatus comprising, in combination, a plurality of film assemblages, means for housing said assemblages and a pair of pressure-applying members biased toward one another, each of said film assemblages comprising a photosensitive element adapted to be photoexposed, a second element adapted to be moved in superposition with said photosensitive element between said pressure-applying members, and leader means comprising a single leader, attached to said photosensitive and second elements, extending between said pressure-applying members to provide means manually engageable for drawing said photosensitive and second elements of said assemblage between said pressure-applying members, said leaders having openings therein in the regions thereof extending between said pressure-applying members whereby at least portions of said pressure-applying members project toward one another through said openings in said leaders and are directly engageable with the photosensitive and second elements of one of said assemblages during movement thereof between said pressure-applying members, said assemblages being arranged in stacked relation in position for exposure with said openings in said leaders so located with respect to one another that said portions of said pressure-applying members may project through said openings in more than one of said leaders simultaneously.

33. The photographic apparatus of claim 32 wherein the opening in each of said leaders of said film assemblages is elongated and extends from side to side thereof, and each of said leaders includes stiffening means located adjacent at least one side of said opening for resisting transverse flexure of said leader in the region of said opening and for evenly distributing tensive forces exerted on the portions of said leader comprising the lateral margins of said leader located at the ends of said opening.

34. A photographic product for use in apparatus for exposing and processing photosensitive sheet materials, said apparatus including a pair of pressure-applying members between which said sheet materials are moved for effecting said processing, said product comprising, in combination, a plurality of photographic film assemblages intended to be moved, one at a time, between said pressure-applying members, each of said assemblages comprising a photosensitive element, a second element adapted to be moved in superposition with said photosensitive element between said pressure-applying members for effecting the distribution of a fluid processing agent over a predetermined area of said photosensitive element, leader means comprising a single leader attached to said photosensitive and second elements and comprising a first section attached to said photosensitive and second elements and adapted to be located to one side of said pressure-applying members, a second section adapted to be located on the opposite side of said pressure-applying members, and a pair of spaced-apart connecting elements joining marginal portions of said first and second sections, said connecting elements being spaced from one another by a distance at least equal to said area of said photosensitive element over which said fluid processing agent is distributed and being adapted to extend between portions of said pressure-applying members whereby said pressure-applying members can project toward one another between said spaced-apart connecting elements and are directly engageable with the photosensitive and second elements of one of said assemblages during movement thereof between said pressure-applying members, each of said second sections of said leaders providing manually engageable means for drawing the photosensitive and second elements of one of said assemblages in superposition between said pressure-applying members.

35. The photographic product of claim 34 wherein said second section of each of said leaders is provided with stiffening means located adjacent the edge of said second section in engagement with said connecting elements for resisting transverse flexure of said second section and for uniformly distributing tensive forces transmitted by said connecting elements from said second section to said first section.

36. A photographic product for use in apparatus for exposing and thereafter processing photosensitive sheet materials, said apparatus including a pair of pressure-applying members between which said sheet materials are moved for effecting said processing, said product comprising, in combination, a plurality of photographic film assemblages adapted to be moved, one at a time, between said pressure-applying members, each of said assemblages comprising a photosensitive element adapted to be exposed in said apparatus, a second element adapted to be moved in superposition with said photosensitive element between said pressure-applying members, and leader means comprising at least a leader attached to at least one of said elements and adapted to extend between said pressure-applying members and provide means for drawing at least one of said photosensitive and second elements between said members, each of said leaders having an elongated opening therein extending from side to side thereof in the region of said leader adapted to be located between said pressure-applying members whereby at least portions of said pressure-applying members project toward one another through said openings in said leaders for directly engaging the photosensitive and second elements of one of said assemblages during movement of said one assemblage between said pressure-applying members, each of said leaders being flexible and including stiffening means located adjacent the side of said opening opposite the element attached to said leader for resisting transverse flexure of said leader in the region of said opening and for evenly distributing tensive forces on the marginal portions of said leader located at the ends of said opening, said stiffening means comprising a tab of a relatively inflexible sheet material attached to said leader adjacent the last-mentioned side of said opening and extending into engagement with said lateral marginal portions of said leader.

37. The photographic product of claim 36 wherein the sheet material comprising each of said leaders is paper and each of said tabs is cardboard, and the tabs of successive assemblages are of different lengths.

38. Photographic apparatus for holding photosensitive sheet materials for exposure and thereafter processing said sheet materials, said apparatus comprising, in combination, a plurality of film assemblages, a pair of pressure-applying members, means for biasing said pressure-applying members toward one another, each of said film assemblages comprising a photosensitive element, a second element adapted to be moved in superposition with said photosensitive element between said pressure-applying members for effecting the processing of said photosensitive element following exposure thereof and leader means comprising at least a leader attached to at least one of said elements, and housing means for enclosing and mounting said assemblages with the photosensitive elements thereof in position for exposure and with said leaders extending between said pressure-applying members, each of said leaders being flexible and having an elongated opening therein extending from side to side thereof in the region of said leader located between said pressure-applying members, each of said leaders including stiffening means in the form of a tab of a relatively inflexible sheet material attached to said leader adjacent the side of said opening opposite the element attached to said leader for resisting transverse flexure of said leader in the region of said opening and for equally distributing tensive forces exerted on the marginal portions of said leader located at the ends of said opening, said tabs projecting exterior of said housing means through an opening therein and providing means for manually grasping and drawing said photosensitive and second elements of each assemblage between said pressure-applying members, at least portions of said pressure-applying members projecting toward one another through said openings in said leaders for direct engagement with the photosensitive and second elements of one of said assemblages during movement thereof between said pressure-applying members.

39. The photographic apparatus of claim 38 wherein the sheet material comprising each of said leaders is paper, each of said tabs is cardboard, and the tabs of successive assemblages are of different lengths.

40. A photographic product for use in apparatus for exposing and processing photosensitive sheet materials, said apparatus including a pair of pressure-applying members between which said sheet materials are moved for effecting said processing, said product comprising, in combination, a plurality of photographic film assemblages intended to be moved, one at a time, between said pressure-applying members, each of said assemblages comprising a photosensitive element, a second element adapted to be moved in superposition with said photosensitive element between said pressure-applying members for initiating the processing of said photosensitive element following exposure thereof and leader means comprising at least a leader attached to at least one of said photosensitive and second elements, each leader of each of said leader means comprising a first section attached to said one of said elements and adapted to be located to one side of said pressure-applying members, a second section adapted to be located on the other side of said pressure-applying members, a pair of spaced-apart connecting elements connecting said first and second sections at their lateral margins and adapted to extend between portions of said pressure-applying members at opposite ends of other portions of said pressure-applying members whereby said other portions of said pressure-applying members can project toward one another between said first and second sections and said connecting elements for directly engaging the photosensitive and second elements of one of said assemblages during movement thereof between said pressure-applying members, and stiffening means in the form of a tab of a relatively inflexible sheet material secured to said second section of each of said leaders in engagement with said connecting elements for resisting transverse flexure of said second section, said tab being adapted to extend from said apparatus and provide means for manually drawing at least one of said photosensitive and second elements between said pressure-applying members and for evenly distributing tensive forces on said spaced-apart connecting elements.

41. The photographic product of claim 40 wherein the sheet material comprising each of said leaders is paper, the sheet material comprising each of said tabs is cardboard, and the tabs of successive assemblages are of different lengths.

42. A photographic product for use in apparatus for exposing and thereafter processing photosensitive sheet materials, said apparatus including a pair of pressure-applying members between which said sheet materials are moved for effecting said processing, said product comprising, in combination, a plurality of photographic film assemblages adapted to be moved, one at a time, between said pressure-applying members, each of said assemblages comprising a photosensitive element adapted to be exposed in said apparatus, a second element adapted to be moved in superposition with said photosensitive element between said pressure-applying members to effect the distribution of a fluid processing agent over a predetermined area of said photosensitive element, leader means comprising at least a leader attached to at least one of said elements and adapted to extend between said pressure-applying members for drawing at least one of said photosensitive and second elements between said members, and a rupturable container of a fluid processing agent so associated with at least one of said elements as to be located between said elements during movement thereof between said pressure-applying members, each leader of said leader means having an opening therein at least equal in length to the width of said area in the region of said leader adapted to be located between said pressure-applying members, said elements being arranged with said openings so aligned that at least portions of said pressure-applying members can project toward one another through said openings in said leaders for directly engaging the photosensitive and second elements of one of said assemblages during movement of said one assemblage between said pressure-applying members.

43. The photographic product of claim 42 wherein each of said photosensitive elements comprises photosensitive silver halide and said fluid processing agent includes a silver halide developer.

44. Photographic apparatus for holding photosensitive sheet materials for exposure and thereafter processing said sheet materials, said product comprising, in combination, a plurality of film assemblages, means for housing said assemblages, and a pair of pressure-applying members biased toward one another, each of said film assemblages comprising a photosensitive element having an area adapted to be photoexposed in said apparatus, a second element adapted to be moved in superposition with said photosensitive element between said pressure-applying members to effect the distribution of a fluid processing agent over said area, leader means comprising at least a leader, attached to at least one of said elements, extending between said pressure-applying members and being manually engageable for drawing at least one of said photosensitive and second elements of said assemblage between said pressure-applying members, and a rupturable container of a fluid processing agent adapted to be located between said elements during movement thereof between said pressure-applying members, each leader of said leader means having an opening therein at least equal in length to the width of said area in the region of said leader extending between said pressure-applying members whereby at least portions of said pressure-applying members project toward one another through said openings in said leaders and are directly engageable with the photosensitive and second elements of one of said assemblages during movement thereof between said pressure-applying members.

45. The photographic apparatus of claim 44 wherein each of said photosensitive elements comprises a photosensitive silver halide and said fluid processing agent comprises a silver halide developer.

46. A photographic product for use in apparatus for exposing and processing photosensitive sheet materials, said apparatus including a pair of pressure-applying members between which said sheet materials are moved for effecting said processing, said product comprising, in combination, a plurality of photographic film assemblages intended to be moved, one at a time, between said pressure-applying members, each of said assemblages comprising a photosensitive element having an area adapted to be exposed in said apparatus, a second element adapted to be moved in superposition with said photosensitive element between said pressure-applying members for distributing a fluid processing agent over said area, leader means comprising at least a leader attached to at least one of said photosensitive and second elements, each leader of said leader means comprising a first section attached to said one of said elements and adapted to be located to one side of said pressure-applying members, a second section adapted to be located on the opposite side of said pressure-applying members and a pair of connecting elements joining said first and second sections, said connecting elements being spaced apart by a distance of at least equal to the width of said area so as to extend between portions of said pressure-applying members at opposite ends of other portions of said pressure-applying members whereby said other portions of said pressure-applying members are capable of projecting toward one another between said first and second sections and said spaced-apart elements of said film assemblages for directly engaging the photosensitive and second elements of one of said assemblages during movement thereof between said pressure-applying members, and at least a rupturable container of a fluid processing agent located between portions of the photosensitive and second elements comprising each film assemblage in the region of said first sections of said leaders, each of said second sections of said leaders being manually engageable for drawing at least one of said photosensitive and second elements between said pressure-applying members.

47. The photographic product of claim 46 wherein each of said photosensitive elements comprises a photosensitive silver halide and said fluid processing agent comprises a silver halide developer.

48. A photographic product for use in apparatus for exposing and thereafter processing photosensitive sheet materials, said apparatus including a pair of pressure-applying members between which said sheet materials are moved for effecting said processing, said product comprising, in combination, a plurality of photographic film assemblages adapted to be moved, one at a time, between said pressure-applying members, each of said assemblages comprising a photosensitive element having an area adapted to be exposed in said apparatus, a second element adapted to be moved in superposition with said photosensitive element between said pressure-applying members for distributing a fluid processing agent over said area and leader means comprising at least a leader, attached to at least one of said elements, adapted to extend between said pressure-applying members for drawing at least one of said photosensitive and second elements between said members, each leader of said leader means having an opening therein at least equal in length to the width of said area in the region of said leader adapted to be located between said pressure-applying members whereby at least portions of said pressure-applying members can project toward one another through said openings in said leaders for directly engaging the photosensitive and second elements of one of said assemblages during movement of said one assemblage between said pressure-applying members, means for enclosing at least said photosensitive elements of said assemblages, said means comprising an envelope within which at least said photosensitive elements are arranged in stacked relation and having an opening through which said elements can be exposed, said photosensitive elements being arranged with said areas thereof in substantial registration with the last-mentioned opening and with said openings in said leaders in substantial registration, and closure means removable from said envelope for closing said opening against the admission of light.

49. The photographic product of claim 48 wherein at least said photosensitive elements include trailing end portions secured to said envelope.

50. The photographic product of claim 48 wherein said envelope includes means for securing said elements within said envelope, and retaining means for releasably securing said envelope within the apparatus in which it is employed.

51. A photographic product for use in apparatus for exposing and thereafter processing photosensitive sheet materials, said apparatus including a pair of pressure-applying members between which said sheet materials are moved for effecting said processing, said product comprising, in combination, a plurality of photographic film assemblages adapted to be moved, one at a time, between said pressure-applying members, each of said assemblages comprising a photosensitive element having an area adapted to be exposed in said apparatus, a second element adapted to be moved in superposition with said photosensitive element between said pressure-applying members for effecting the distribution of a fluid processing agent between said elements over said area and leader means comprising at least a leader, attached to at least one of said elements, adapted to extend between said pressure-applying members for drawing at least one of said photosensitive and second elements between said members, each leader of said leader means having an opening therein at least equal in length to the width of said area in the region of said leader adapted to be located between said pressure-applying members whereby at least portions of said pressure-applying members can project toward one another through said openings in said leaders for directly engaging the photosensitive and second elements of one of said assemblages during movement of said one assemblage between said pressure-applying members, first envelope means for enclosing at least said photosensitive elements of said assemblages, said first envelope having an opening through which said photosensitive elements can be exposed, said photosensitive elements being arranged in stacked relation in said first envelope with said areas in substantial registration with the last-mentioned opening and with said opening in said leaders in substantial alignment, means removable from said first envelope for closing said opening in said envelope against the admission of light, and a second envelope joined at one end to said first envelope, said second envelope being adapted to project between said pressure-applying members and having openings generally corresponding to said openings in said leaders through which said pressure-applying members project toward one another, said second envelope being open at its other end with said leaders extending through and from said second envelope.

52. A photographic product for use in apparatus for exposing and thereafter processing photosensitive sheet materials, said apparatus including a pair of pressure-applying members between which said sheet materials are moved for effecting said processing, said product comprising, in combination, a plurality of photographic film assemblages adapted to be moved, one at a time, between said pressure-applying members, each of said assemblages comprising a photosensitive element having an area adapted to be exposed in said apparatus, a second element adapted to be moved in superposition with said photosensitive element between said pressure-applying members for distributing a fluid processing agent between said elements over said area and leader means comprising at least a leader, attached to at least said photosensitive element, adapted to extend between said pressure-applying members for drawing at least said photosensitive element between said members, each leader of said leader means having an opening therein at least equal in length to the width of said area in the region of said leader adapted to be located between said pressure-applying members whereby at least portions of said pressure-applying members can project toward one another through said openings in said leaders for directly engaging the photosensitive and second elements of one of said assemblages during movement of said one assemblage between said pressure-applying members, means for mounting and enclosing said film assemblages, said means comprising a housing providing a first chamber, an opening in said first chamber through which said photosensitive elements are exposed, said photosensitive elements being arranged in stacked relation in said first chamber with said areas thereof in substantial registration with the last-mentioned opening, closure means removable from said first chamber for closing said last-mentioned opening therein, and a second chamber within which said second elements are provided in stacked relation, said leaders, attached to said photosensitive elements, extending from said first chamber through said second chamber with said openings in said leaders in substantial registration and from said second chamber whereby said photosensitive elements can be drawn from said first chamber into said second chamber into superposition with said second elements and from said second chamber between said pressure-applying members.

53. The photographic product of claim 52 wherein at least said photosensitive elements include trailing end portions secured within said first chamber.

54. Photographic apparatus for holding photosensitive sheet materials for exposure and thereafter processing said sheet materials, said apparatus comprising, in combination, a pair of pressure applying members biased toward one another, a plurality of film assemblages each comprising a photosensitive element having an area adapted to be photoexposed, a second element adapted to move in superposition with said photosensitive element between said pressure-applying members for distributing a fluid processing agent between said elements over said area and leader means comprising at least a leader attached to said photosensitive element, and means for housing said assemblages and said pair of pressure-applying members, the last-mentioned means comprising a first chamber in which at least said photosensitive elements are positioned for exposure and a second chamber, said pressure-applying members being located between said first and second chambers, said leaders extending from said first chamber between said pressure-applying members into and from said second chamber so as to be manually engageable for drawing at least said photosensitive elements from said first chamber between said pressure-applying members into said second chamber, each leader of said leader means having an opening therein at least equal in length to the width of said area in the region of said leader extending between said pressure-applying members whereby at least portions of said pressure-applying members project toward one another through said openings in said leaders and are directly engageable with the photosensitive and second elements of one of said assemblages during movement thereof between said pressure-applying members.

55. Photographic apparatus for holding photosensitive sheet materials for exposure and thereafter processing said sheet materials, said apparatus comprising, in combination, a pair of pressure-applying members biased toward one another, a plurality of film assemblages each comprising a photosensitive element having an area adapted to be photoexposed, a second element adapted to be moved in superposition with said photosensitive element between said pressure-applying members for distributing a fluid processing agent between said elements over said area and leader means comprising a pair of leaders each attached to one of said photosensitive and second elements, and means for housing said assemblages and said pressure-applying members, said housing means comprising a first chamber in which said photosensitive elements are positioned for exposure, a second chamber in which said second elements are positioned during exposure of said photosensitive elements and a third chamber communicating with said first and second chambers, said pressure-applying members being located at the entrance of said third chamber from said first and second chambers, said leaders extending from their respective first and second chambers between said pressure-applying members into and from said third chamber and being manually engageable for drawing said photosensitive and second elements of said assemblages from their respective first and second chambers between said pressure-applying members into said third chamber, each of said leaders having an opening therein at least equal in length to the width of said area in the region thereof extending between said pressure-applying members whereby at least portions of said pressure-applying members project toward one another through said openings in said leaders and are directly engageable with the photosensitive and second elements of one of said assemblages during movement thereof between said pressure-applying members.

56. Photographic apparatus for holding photosensitive sheet materials for exposure and thereafter processing said sheet materials, said apparatus comprising, in combination, a pair of pressure-applying members biased toward one another, a plurality of film assemblages each comprising a photosensitive element having an area adapted to be photoexposed, a second element adapted to be moved in superposition with said photosensitive element between said pressure-applying members for distributing a fluid processing agent between said elements over said area and leader means attached to said photosensitive and second elements of said assemblage, and means for housing said assemblages and said pressure-applying members, the last-mentioned means comprising a first chamber in which the photosensitive and second elements of said assemblages are mounted with said photosensitive elements in position for exposure, a second chamber communicating with said first chamber and adapted to receive the photosensitive and second elements of each assemblage, said pair of pressure-applying members being mounted between said first and second chambers, said leader means extending from said first chamber between said pressure-applying members into and from said second chamber and providing means for manually drawing said assemblages from said first chamber between said pressure-applying members into said second chamber, each of said leader means having an opening therein at least equal in length to the width of said area in the region of said leader means extending between said pressure-applying members whereby at least portions of said pressure-applying members project toward one another through said openings in said leader means and are directly engageable with the photosensitive and second elements of one of said assemblages during movements thereof between said pressure-applying member.

57. A photographic product for use in apparatus for exposing and processing photosensitive sheet materials, said apparatus including a pair of pressure-applying members between which said sheet materials are moved for effecting said processing, said product comprising, in combination, a plurality of photographic film assemblages intended to be moved, one at a time, between said pressure-applying members, each of said assemblages comprising a photosensitive element having an area adapted to be photoexposed, a second element adapted to be moved in superposition with said photosensitive element between said pressure-applying members for distributing a fluid processing agent between said elements over said area and leader means comprising at least a leader attached to at least one of said photosensitive and second elements, each leader of said leader means comprising a first section attached to said one of said elements and adapted to be located to one side of said pressure-applying members, a second section adapted to be located on the opposite side of said pressure-applying members and a pair of connecting elements joining said first and second sections and being adapted to extend between portions of said pressure-applying members at opposite ends of other portions of said pressure-applying members, each of said second sections of said leaders being manually engageable for drawing at least one of said photosensitive and second elements between said pressure-applying members, said connecting elements being spaced apart by a distance at least equal to the width of said area so that said other portions of said pressure-applying members project toward one another between said first and second sections and said spaced-apart elements of said film assemblages and directly engage the photosensitive and second elements of one of said assemblages during movement thereof between said pressure-applying members, means for enclosing at least said photosensitive elements of said assemblages, said means comprising an envelope having an opening through which said elements can be exposed, at least said photosensitive elements being arranged in stacked relation within said envelope with said areas in substantial registration with the last-mentioned opening, and closure means mounted within said envelope for closing said last-mentioned opening against the admission of light and being removable from said envelope.

58. The photographic product of claim 57 wherein at least said photosensitive elements include trailing end portions secured to said envelope.

59. The photographic product of claim 57 wherein said envelope includes means for securing said elements within said envelope, and retaining means for releasably securing said envelope within the apparatus in which it is employed.

60. A photographic product for use in apparatus for exposing and processing photosensitive sheet materials, said apparatus including a pair of pressure-applying members between which said sheet materials are moved for effecting said processing, said product comprising, in combination, a plurality of photographic film assemblages intended to be moved, one at a time, between said pressure-applying members, each of said assemblages comprising a photosensitive element, a second element adapted to be moved in superposition with said photosensitive element between said pressure-applying members and means comprising at least a leader attached to at least one of said photosensitive and second elements, each leader of said leader means comprising a first section attached to said one of said elements and adapted to be located to one side of said pressure-applying members, a second section adapted to be located on the opposite side of said pressure-applying members and a pair of spaced-apart connecting elements joining said first and second sections and extending between portions of said pressure-applying members at opposite ends of other portions of said pressure-applying members, each of said second sections of said leaders being manually engageable for drawing at least one of said photosensitive and second elements between said pressure-applying members, said spaced-apart connecting elements being so positioned and arranged that said other portions of said pressure-applying members can project toward one another between said first and second sections and said spaced-apart elements of said film assemblages and directly engage the photosensitive and second elements of one of said assemblages during movement thereof between said pressure-applying members, first envelope means open at one end for enclosing at least said photosensitive elements of said assemblages, said photosensitive elements being arranged in stacked relation within said first envelope with the openings defined by said first and second sections and said connecting elements of each of said leaders in substantial registration, said first envelope having an opening through which said photosensitive elements can be exposed, means within said first envelope for closing said opening against the admission of light and being removable from said first envelope to permit the exposure of said photosensitive elements, and a second envelope joined at one end to said one end of said first envelope and open at its other end, said envelope being adapted to project between said pressure-applying members, said second sections of said leaders extending through said second envelope and from the open end thereof to provide means whereby at least one of said elements of each of said film assemblages can be drawn between said pressure-applying members into said second envelope, said second envelope having openings generally corresponding to said openings defined by said first and second sections and said spaced-apart connecting elements whereby said pressure applying members project toward one another through said openings in said envelope.

61. A photographic product for use in apparatus for exposing and processing photosensitive sheet materials, said apparatus including a pair of pressure-applying members between which said sheet materials are moved for effecting said processing, said product comprising, in combination, a plurality of photographic film assemblages intended to be moved, one at a time, between said pressure-applying members, each of said assemblages comprising a photosensitive element having an area adapted to be photoexposed, a second element adapted to be moved in superposition with said photosensitive element between said pressure-applying members for distributing a fluid processing agent between said elements over said area and leader means comprising at least a leader attached to at least said photosensitive element, each leader of said leader means comprising a first section attached to said photosensitive element and adapted to be located to one side of said presure-applying members, a second section adapted to be located on the opposite side of said pressure-applying members and a pair of spaced-apart connecting elements joining said first and second sections and adapted to extend between portions of said pressure-applying members at opposite ends of other portions of said pressure-applying members, each of said second sections being manually engageable for drawing at least one of said photosensitive and second elements between said pressure-applying members, said connecting elements being spaced apart by a distance at least equal to the width of said area so that said other portions of said pressure-applying members project toward one another between said first and second sections and said spaced-apart elements of said film assemblages and directly engage the photosensitive and second elements of one of said assemblages during movement thereof between said pressure-applying members, means for mounting and enclosing said film assemblages, said means comprising a housing including a first chamber in which said photosensitive elements are arranged in stacked relation, an opening in said first chamber through which the photosensitive elements are exposed, said areas of said photosensitive elements being arranged in substantial registration with the last-named opening, and closure means within said first chamber and removable therefrom for closing said last-named opening against the admission of light, and a second chamber within which said second elements are provided in stacked relation, said leaders, attached to said photosensitive elements, extending from said first chamber through said second chamber from said second chamber whereby said photosensitive elements can be drawn from said first chamber into said second chamber into superposition with said second elements and from said second chamber between said pressure-applying members.

62. The photographic product of claim 61 wherein at least said photosensitive elements include trailing end portions secured within said first chamber.

63. A photographic product for use in apparatus for exposing and thereafter processing photosensitive sheet materials, said apparatus including a pair of pressure-applying members between which said sheet materials are moved for effecting said processing, said product comprising, in combination, a plurality of photographic film assemblages adapted to be moved, one at a time, between said pressure-applying members, each of said assemblages comprising a photosensitive element adapted to be exposed in said apparatus, a second element adapted to be moved in superposition with said photosensitive element between said pressure-applying members and leader means comprising at least a leader, attached to at least one of said elements, extending between said pressure-applying members for drawing at least one of said photosensitive and second elements between said members, each leader of said leader means having an opening therein at least equal in length to the width of said area in the region of said leader adapted to be located between said pressure-applying members whereby at least portions of said pressure-applying members can project toward one another through said opening in said leader for directly engaging the photosensitive and second elements of one of said assemblages during movement of said one assemblage between said pressure-applying members, and means for enclosing at least said photosensitive elements of said assemblages and comprising an envelope open at one end, at least said photosensitive elements being arranged in stacked relation with said envelope with said leader means extending therefrom and with said openings in said leaders in substantial registration, said envelope having an opening through which said elements can be exposed, closure means within said envelope for closing the last-mentioned opening against the admission of light and being removable from said envelope to permit the exposure of photosensitive elements located therein, and a backing element within said envelope located on the side of said photosensitive elements opposite said opening in said envelope, said backing element being secured within said envelope and said photosensitive elements being secured within said envelope to said backing element.

64. A photographic product for use in apparatus for exposing and processing photosensitive sheet materials, said apparatus including a pair of pressure-applying members between which said sheet materials are moved for effecting said processing, said product comprising, in combination, a plurality of photographic film assemblages intended to be moved, one at a time, between said pressure-applying members, each of said assemblages comprising a photosensitive element, a second element adapted to be moved in superposition with said photosensitive element between said pressure-applying members and leader means comprising at least a leader attached to at least one of said photosensitive and second elements, each leader of said leader means comprising a first section attached to said one of said elements and adapted to be located to one side of said pressure-applying members, a second section adapted to be located on the opposite side of said pressure-applying members and a pair of spaced-apart connecting elements joining said first and second sections and adapted to extend between portions of said pressure-applying members at opposite ends of other portions of said pressure-applying members, each of said second sections of said leaders being manually engageable for drawing at least one of said photosensitive and second elements between said pressure-applying members, said spaced-apart connecting elements being so positioned and arranged that said other portions of said pressure-applying members can project toward one another between said first and second sections and said spaced-apart elements of said film assemblages and directly engage the photosensitive and second elements of one of said assemblages during movement thereof between said pressure-applying members, means for enclosing at least said photosensitive elements of said assemblages and comprising an envelope open at one end, said photosensitive elements being arranged in stacked relation within said envelope with said leader means projecting therefrom with the openings defined by said connecting elements and first and second sections of said leaders in substantial registration, said envelope having an opening through which said elements can be exposed, closure means within said envelope for closing said opening in said envelope against the admission of light and being removable from said envelope to permit the exposure of photosensitive elements located therein, and a backing element within said envelope located on the side of said photosensitive elements opposite said opening in said envelope, said backing element being secured within said envelope and said photosensitive elements being secured to said backing element.

65. A photographic film assemblage useful for producing a photographic image and adapted to be employed, with at least another assemblage, in photographic apparatus when it is drawn between a pair of pressure-applying members to effect the processing of said assemblage by a fluid agent distributed therein, said assemblage comprising, in combination, a photosensitive sheet having an area adapted to be photoexposed for producing a latent image, a second sheet adapted to be superposed with said photosensitive sheet to aid in the processing of said photosensitive sheet following exposure thereof by a fluid agent distributed between said sheets over said area by movement of said assemblage between said pressure-applying members, and leader means comprising at least a leader sheet attached to one end of at least one of said photositive and second sheets and providing means whereby at least said one of said sheets of said assemblage can be drawn between said pair of pressure-applying members, each leader sheet of said leader means including an opening therein at least equal in length to the width of said area whereby said pressure-applying members can project toward one another into direct engagement with the photosensitive and second sheets of another film assemblage during movement of the latter between said pressure-applying members.

66. The photographic film assemblage of claim 65 wherein said opening in said leader sheet is substantially elongated and extends from side to side thereof, and said leader sheet includes stiffening means located adjacent at least one side of said opening for resisting transverse flexure of said leader sheet in the region of said opening and for evenly distributing tensive forces exerted on the portions of said leader sheet comprising the lateral margins of said leader sheet located at the ends of said opening.

67. The photographic film assemblage of claim 66 wherein said stiffening means comprises a tab of a relatively inflexible sheet material secured to said leader sheet adjacent the side of said opening opposite the photosensitive or second sheet attached to said leader sheet.

68. The photographic film assemblage of claim 65 wherein said opening in said leader sheet is tapered toward its ends.

69. A photographic film assemblage useful for producing a photographic image and adapted to be employed, along with at least another assemblage, in apparatus wherein it is drawn between a pair of pressure-applying members to effect the processing of said assemblage by a fluid agent distributed therein, said assemblage comprising in combination, a photosensitive sheet having an area adapted to be exposed for producing a latent image, a second sheet adapted to be superposed with said photosensitive sheet and aid in the processing of said photosensitive sheet following exposure thereof by a fluid agent distributed between said sheets over said area in response to movement of said assemblage between said pressure-applying members, and leader means comprising a pair of leader sheets each attached to one of said photosensitive and second sheets and providing means whereby said sheets comprising said assemblage can be drawn between said pair of pressure-applying members, said leader sheets including openings therein at least equal in length to the width of said area, said openings being in substantial registration whereby said pressure-applying members can project toward one another into direct engagement with the photosensitive and second sheets of another film assemblage during movement of the latter between said pressure-applying members.

70. The photographic film assemblage of claim 69 wherein said openings in said leader sheets are substantially elongated and extend from said to side thereof, and each of said leader sheets includes stiffening means located adjacent at least one side of said opening therein for resisting transverse flexure of said leader sheet in the region of said opening and for evenly distributing tensive forces exerted on the portions of said leader sheet comprising the lateral margins of said leader sheet located at the ends of said opening.

71. The photographic film assemblage of claim 70 wherein said stiffening means comprises a tab of a relatively inflexible sheet material secured to said leader sheet adjacent the side of said opening opposite the photosensitive or second sheet attached to said leader sheet.

72. The photographic film assemblage of claim 69 wherein said opening in said leader sheet is tapered toward its ends.

73. A photographic film assemblage useful for producing a photographic image and adapted to be employed, along with another assemblage, in photographic apparatus wherein it is drawn between a pair of pressure-applying members to effect the processing of said assemblage by a fluid agent distributed therein, said assemblage comprising, in combination, a photosensitive sheet having an area adapted to be exposed for producing a latent image, a second sheet adapted to be superposed with said photosensitive sheet and aid in the processing of said photosensitive sheet following exposure thereof by a fluid agent distributed in a layer between said sheets over said area in response to movement of said assemblage between said pressure-applying members, and leader means comprising a single leader sheet, attached to the ends of said photosensitive and second sheets, and providing means whereby said photosensitive and second sheets can be drawn in superposition between said pair of pressure-applying members, said leader sheet including an opening therein at least equal in length to the width of said area whereby one of said pressure-applying members can project toward the other and into direct engagement with the photosensitive and second sheets of another film assemblage during movement of the latter between said pressure-applying members.

74. The photographic film assemblage of claim 73 wherein said opening in said leader sheet is substantially elongated and extends from said to side thereof, and said leader sheet includes stiffening means located adjacent at least one side of said opening for resisting transverse flexure of said leader sheet in the region of said opening and for evenly distributing tensive forces exerted on the portions of said leader sheet comprising the lateral margins of said leader sheet located at the ends of said opening.

75. The photographic film assemblage of claim 74 wherein said stiffening means comprises a tab of a relatively inflexible sheet material secured to said leader sheet adjacent the side of said opening opposite said photosensitive and second sheets attached to said leader sheet.

76. The photographic film assemblage of claim 73 wherein said opening in said leader sheet is tapered toward its ends.

77. The photographic film assemblage of claim 73 wherein said photosensitive and second sheets are arranged in superposition and said second sheet is light transmitting whereby said photosensitive sheet can be exposed through said second sheet.

78. The photographic film assemblage of claim 77 useful for producing a visible photographic image by a process involving the transfer of image-forming substances produced as a result of the development of a latent image in said photosensitive sheet, and wherein said second sheet comprises a photographic screen element.

79. A photographic assemblage useful for producing a visible image by a process involving the transfer of image-forming substances produced as a result of development of a latent image formed in a photosensitive material and effected by a fluid agent distributed within said assemblage in response to movement thereof between a pair of pressure-applying members, said assemblage comprising a first sheet having an area including a photosensitive silver halide and a second sheet adapted to be superposed with said first sheet and to be drawn in superposition with said first sheet following exposure of said silver halide between a pair of pressure-applying members to effect the distribution of a fluid processing agent between said sheets over said area, and leader means comprising at least a leader attached to one end of at least one of said first and second sheets for providing means whereby at least one of said sheets of said assemblage can be drawn between said pair of pressure-applying members, said leader comprising a first section attached to one of said sheets and adapted to be located to one side of said pressure-applying members, a second section adapted to be located on the opposite side of said pressure-applying members, and a pair of connecting elements joining said first and second sections at their lateral margins, said connecting elements being spaced apart by a distance at least equal to the width of said area and adapted to extend between portions of said pressure-applying members at opposite ends of other portions of said pressure-applying members whereby said other portions of said pressure-applying members can project toward one another between said first and second sections and said spaced-apart connecting elements of said assemblage and directly engage the first and second sheets of another assemblage during movement thereof between said pressure-applying members.

80. The photographic assemblage of claim 79 wherein said second section of each of said leaders includes stiffening means extending from side to side of said second section and coupled with said connecting elements.

81. The photographic assemblage of claim 79 wherein at least said first and second sections of each of said leaders comprise flexible sheet material and said stiffening means comprises a tab of a relatively inflexible sheet material.

References Cited in the file of this patent

UNITED STATES PATENTS 2,477,304     Land                  July 26, 1949

UNITED STATES PATENT OFFICE
CERTIFICATE OF CORRECTION

Patent No. 2,903,951 September 15, 1959

Edwin H. Land

It is hereby certified that error appears in the printed specification of the above numbered patent requiring correction and that the said Letters Patent should read as corrected below.

Column 9, line 52, for "precessing" read -- processing --; line 56, for "apertrue" read -- aperture --; line 62, for "assemblage" read -- assemblages --; column 10, line 14, for "maginal" read -- marginal --; column 12, line 65, for "ont" read -- one --; column 14, line 41, for "as pin" read -- as a pin --; column 16, line 58, first occurrence, and column 17, line 4, for "in" read -- into --; column 19, line 75, for "releated" read -- related --; column 21, line 48, for "It" read -- In --; column 22, line 3, for "compositive" read -- composite --; column 24, line 60, for "betwen" read -- between --; column 27, line 26, for "locate" read -- located --; column 30, line 37, for "leaders" read -- leader --; column 35, line 17, for "product" read -- apparatus --; line 71, strike out "of" first occurrence; column 39, line 32, for "movements" read -- movement --; line 33, for "member" read -- members --; column 43, lines 4 and 5, for "photositive" read -- photosensitive --.

Signed and sealed this 14th day of June 1960.

(SEAL)
Attest:

KARL H. AXLINE
Attesting Officer

ROBERT C. WATSON
Commissioner of Patents